US008559444B2

(12) United States Patent
Kokot et al.

(10) Patent No.: US 8,559,444 B2
(45) Date of Patent: Oct. 15, 2013

(54) CONTROLLING DATA LINK LAYER ELEMENTS WITH NETWORK LAYER ELEMENTS

(75) Inventors: Mathias Kokot, Medford, MA (US);
Hermann Rodler, Oberhaching (DE);
Kurt Melden, Manchester, MA (US);
Jerome Moisand, Arlington, MA (US);
Thomas Gemmer, Munich (DE)

(73) Assignee: Juniper Networks, Inc., Sunnyvale, CA (US)

( * ) Notice: Subject to any disclaimer, the term of this patent is extended or adjusted under 35 U.S.C. 154(b) by 396 days.

(21) Appl. No.: 12/825,054

(22) Filed: Jun. 28, 2010

(65) Prior Publication Data
US 2010/0265947 A1    Oct. 21, 2010

Related U.S. Application Data

(62) Division of application No. 10/601,131, filed on Jun. 20, 2003, now Pat. No. 7,746,799.

(51) Int. Cl.
*H04L 12/28*    (2006.01)

(52) U.S. Cl.
USPC ..................................... 370/395.53; 370/390

(58) Field of Classification Search
USPC ............. 370/290, 432, 395.53, 396; 709/227, 709/238
See application file for complete search history.

(56) References Cited

U.S. PATENT DOCUMENTS

| 5,740,075 | A  | 4/1998  | Bigham et al. |
| 6,055,571 | A  | 4/2000  | Fulp et al. |
| 6,212,561 | B1 | 4/2001  | Sitaraman et al. |
| 6,331,983 | B1 | 12/2001 | Haggerty et al. |
| 6,522,627 | B1 | 2/2003  | Mauger |
| 6,745,392 | B1 | 6/2004  | Basawapatna et al. |
| 6,754,224 | B1 | 6/2004  | Murphy |
| 6,775,268 | B1 | 8/2004  | Wang et al. |
| 6,778,494 | B1 | 8/2004  | Mauger |

(Continued)

FOREIGN PATENT DOCUMENTS

| EP | 1 134 932 A1 | 9/2001 |
| EP | 1 296 487 A2 | 3/2003 |

(Continued)

OTHER PUBLICATIONS

Response to Office Action dated Apr. 20, 2010, for U.S. Appl. No. 11/621,386, filed Jul. 20, 2010, 18 pp.

(Continued)

*Primary Examiner* — Albert T Chou
(74) *Attorney, Agent, or Firm* — Shumaker & Sieffert, P.A.

(57) ABSTRACT

A network layer device controls provision of data link layer functionality by a data link layer device to provide a requested multimedia service to a subscriber. For example, the network layer device may control the performance of multicast elaboration by the data link layer device, or the queuing and forwarding of packets by the data link layer device to facilitate transmission of packets according to a Quality of Service class. The network layer device may send control messages to the data link layer device to dynamically configure a control object stored by the data link layer device, such as multicast filter information or a Quality of Service profile. The network layer device may be a service edge router, and the data link layer device may be a customer premises equipment device, e.g., a modem or wireless access point, or a switch, e.g., a digital subscriber line access multiplier.

23 Claims, 16 Drawing Sheets

(56) References Cited

U.S. PATENT DOCUMENTS

| | | | |
|---|---|---|---|
| 6,826,196 B1 | 11/2004 | Lawrence | |
| 6,937,596 B2 | 8/2005 | Sjolund et al. | |
| 6,937,608 B1 | 8/2005 | Deng | |
| 6,947,418 B2* | 9/2005 | Boura et al. | 370/390 |
| 6,996,110 B1 | 2/2006 | Amara et al. | |
| 7,023,838 B1 | 4/2006 | Hahn et al. | |
| 7,245,614 B1 | 7/2007 | Podar et al. | |
| 7,356,001 B1 | 4/2008 | Jones et al. | |
| 7,613,188 B1 | 11/2009 | French et al. | |
| 7,746,799 B2 | 6/2010 | Kokot et al. | |
| 8,121,124 B2 | 2/2012 | Baykal et al. | |
| 2002/0010782 A1* | 1/2002 | Hoebeke et al. | 709/227 |
| 2002/0026525 A1* | 2/2002 | Armitage | 709/238 |
| 2002/0143951 A1* | 10/2002 | Khan et al. | 709/227 |
| 2003/0081616 A1* | 5/2003 | Anders et al. | 370/396 |
| 2003/0123453 A1* | 7/2003 | Ooghe et al. | 370/395.53 |
| 2003/0126289 A1 | 7/2003 | Aggarwal et al. | |
| 2004/0068571 A1 | 4/2004 | Ahmavaara | |
| 2004/0090970 A1 | 5/2004 | Sanchez et al. | |
| 2004/0133700 A1 | 7/2004 | De Clercq et al. | |
| 2004/0258003 A1 | 12/2004 | Kokot et al. | |
| 2005/0152370 A1 | 7/2005 | Meehan et al. | |
| 2006/0187950 A1 | 8/2006 | Bou-Diab et al. | |
| 2007/0286090 A1 | 12/2007 | Rusmisel et al. | |
| 2007/0286204 A1 | 12/2007 | Ould-Brahim | |
| 2009/0010182 A1 | 1/2009 | Tochio | |
| 2009/0168783 A1 | 7/2009 | Mohan et al. | |
| 2009/0279701 A1 | 11/2009 | Moisand et al. | |

FOREIGN PATENT DOCUMENTS

| | | | |
|---|---|---|---|
| EP | 1 318 628 A1 | 6/2003 | |
| EP | 1 453 260 A1 | 9/2004 | |
| EP | 1480405 A1 | 11/2004 | |
| WO | 99 66736 A2 | 12/1999 | |
| WO | 02 14979 A2 | 2/2002 | |

OTHER PUBLICATIONS

Office Action from U.S. Appl. No. 11/621,386, dated Oct. 14, 2010, 23 pp.
"L2TP Multicast Extension" http://www.ietf.org/internet-drafts/draft-ietf-l2tpext-mcast-03.txt, Mar. 2003.
Ooghe, "Framework and Requirements for an Access Node Control Mechanism in Broadband Multi-Service Networks," May 2006, Network Working Group Internet-Draft (28 pgs.).
Wu et al., "Cisco Systems Router-port Group Management Protocol (RGMP)," Internet Draft, RFC 3488, Feb. 2003, pp. 1-17, XP002299262: p. 4, line 17-p. 6, last line.
Fenner., "Internet Group Management Protocol, Version 2," Internet Draft, RFC 2236, Nov. 30, 1997, XP002230720, p. 4, line 1-p. 6, line 8.
Wang et al. "IGMP Snooping: A VLAN-based multicast protocol," 5th IEEE International Conference on High Speed Networks and Multimedia communication, Jul. 3, 2002, pp. 335-340, XP010603050, p. 336, right-hand column, line 1-p. 337, left-hand column, line 25.
Aggarwal et al., "MPLS Upstream Label Assignment and Context Specific Label Space," Network Working Group Internet-Draft, Oct. 2005, 9 pp.
Wadhwa et al., "GSMP extensions for layer 2 control (L2C) Topology Discovery and Line Configuration," Network Working Group Internet-Draft, Jan. 2006, 37 pp.
U.S. Appl. No. 11/068,523, by David H. Blease, filed Feb. 28, 2005.
U.S. Appl. No. 11/621,409, by Rahul Aggarwal, filed Jan. 9, 2007.
U.S. Appl. No. 11/621,386, by Jerome P. Moisand, filed Jan. 9, 2007.
Restriction Requirement for U.S. Appl. No. 11/068,523, dated Jul. 10, 2008, 5 pp.
Response to Restriction Requirement dated Jul. 10, 2008, for U.S. Appl. No. 11/068,523, filed Aug. 11, 2008, 1 pg.
Office Action from U.S. Appl. No. 11/068,523, dated Dec. 11, 2008, 27 pp.
Response to Office Action dated Dec. 11, 2008, for U.S. Appl. No. 11/068,523, filed Mar. 9, 2009, 17 pp.
Office Action from U.S. Appl. No. 11/068,523, dated Jul. 7, 2009, 26 pp.
Response to Office Action dated Jul. 7, 2009, for U.S. Appl. No. 11/068,523, filed Oct. 7, 2009, 18 pp.
Office Action from U.S. Appl. No. 11/068,523, dated Dec. 24, 2009, 38 pp.
Response to Office Action dated Dec. 24, 2009, for U.S. Appl. No. 11/068,523, filed Mar. 24, 2010, 14 pp.
Office Action from U.S. Appl. No. 11/621,409, dated Sep. 22, 2009, 14 pp.
Response to Office Action dated Sep. 22, 2009, for U.S. Appl. No. 11/621,409, filed Dec. 22, 2009, 12 pp.
Office Action from U.S. Appl. No. 11/621,409, dated Apr. 2, 2010, 16 pp.
Response to Office Action dated Apr. 2, 2010, for U.S. Appl. No. 11/621,409, filed Jun. 2, 2010, 13 pp.
Office Action from U.S. Appl. No. 11/621,386, dated Jun. 10, 2009, 15 pp.
Response to Office Action dated Jun. 10, 2009, for U.S. Appl. No. 11/621,386, filed Sep. 10, 2009, 14 pp.
Office Action from U.S. Appl. No. 11/621,386, dated Dec. 1, 2009, 16 pp.
Response to Office Action dated Dec. 1, 2009, for U.S. Appl. No. 11/621,386, filed Mar. 1, 2010, 15 pp.
Office Action from U.S. Appl. No. 11/621,386, dated Apr. 20, 2010, 20 pp.
Office Action from U.S. Appl. No. 12/506,755, dated Jul. 5, 2012, 27 pp.
Response to Office Action dated Jul. 5, 2012, from U.S. Appl. No. 12/506,755, filed Aug. 27, 2012, 34 pp.
Office Action from U.S. Appl. No. 11/621,409, dated Dec. 14, 2010, 13 pp.
Response to Office Action dated Dec. 14, 2010, from U.S. Appl. No. 11/621,409, filed Apr. 1, 2011, 16 pp.
Office Action from U.S. Appl. No. 11/068,523, dated Jan. 6, 2011, 9 pp.
Response to Office Action dated Jan. 6, 2011, from U.S. Appl. No. 11/068,523, filed Feb. 25, 2011, 12 pp.
Notice of Allowance from U.S. Appl. No. 11/068,523, mailed Mar. 28, 2011, 9 pp.
International Search Report from European patent application No. PCT/EP2004/051184, dated Jan. 13, 2005, 5 pp.
European Office Communication from European patent application No. 04741850.4, dated May 18, 2006, 3 pp.
Response to European Office Communication dated May 18, 2006, from European patent application No. 04741850.4, filed Jan. 15, 2007, 23 pp.
Second European Office Communication from European patent application No. 04741850.4, dated Aug. 10, 2007, 4 pp.
Second Response to European Office Communication dated Aug. 10, 2007, from European patent application No. 04741850.4, filed Nov. 27, 2007, 13 pp.
Summons to Oral Proceedings form European patent application No. 04741850.4, dated May 26, 2009, 6 pp.
Statement on Grounds of Appeal from European patent application No. 04741850.4, dated Oct. 27, 2009, 7 pp.
Decision on Application from European patent application No. 04741850.4, dated Nov. 3, 2009, 17 pp.
Office Action from U.S. Appl. No. 12/506,755, dated Jan. 2, 2013, 27 pp.
Response to Office Action dated Jan. 2, 2013, from U.S. Appl. No. 12/506,755, filed Apr. 2, 2013, 4 pp.

* cited by examiner

CONTROLLING DATA LINK LAYER ELEMENTS WITH NETWORK LAYER ELEMENTS

This application is a divisional of application Ser. No. 10/601,131, filed Jun. 20, 2003, which is hereby incorporated by reference.

TECHNICAL FIELD

The invention relates to computer networks and, more particularly, to provision of multimedia subscriber services within a computer network.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within a network, referred to as routers, maintain routing information that describes available routes through the network. Each route defines a path between two locations on the network. Upon receiving an incoming data packet, the router examines header information within the packet to identify the destination for the packet. Based on the header information, the router accesses the routing information, selects an appropriate route for the packet and forwards the packet accordingly.

Network Service Providers (NSPs) provide multimedia services to subscribers via subscriber devices and routers maintained by the NSPs. Routers operate within the third layer, i.e., the network layer, of the Open Systems Interconnection (OSI) reference model, and typically communicate with each other using layer three protocols. As a result, routers are often referred to as network layer devices or layer three devices. Similarly, the functionality provided by routers that facilitates provision of Internet services is often referred to as network layer functionality. The routers maintained by NSPs and used by NSPs to provide multimedia services may be referred to as Service Edge (SE) routers. NSPs may use SE routers to provide multimedia services that are differentiated on a per-subscriber basis.

For example, an NSP may allow subscribers to receive multicast streams on their respective subscriber devices. In order to allow subscribers to receive multicast streams, SE routers process requests from subscriber devices for the multicast streams, e.g., Internet Group Management Protocol (IGMP) host membership reports. To provide requested multicast streams, the SE routers must replicate and forward packets of a multicast stream for each subscriber device that has requested the multicast stream. Replication of multicast streams on a per-subscriber basis consumes significant processing and memory resources of the routers, as well as bandwidth on the outbound network links from the routers.

The NSP may also provide service profiles for subscribers that differ from subscriber to subscriber. Each service profile may include, for example, one or more Quality of Service (QoS) classes for packets originating from or destined for the associated subscriber device. A QoS class may define a bandwidth allocation and burst size to support a level of communication throughput for subscriber devices within that QoS class. Further, the NSP may provide a QoS class for subscribers for certain packet flows on request, such as unicast packet flows associated with a Voice over Internet Protocol (VoIP) call. In order to enable throughput according to QoS class indicated in a service profile for a subscriber or requested by a subscriber for a packet flow, routers maintained by NSPs may forward packets originating from or destined for the subscriber on particular packet flows through a network, which may be designated for the QoS class and engineered to support the throughput, e.g., provide the bandwidth, associated with the QoS class.

SUMMARY

In general, the invention is directed to techniques that allow a network layer device, such as a service edge (SE) router, to control provision of data link layer functionality by a data link layer device in order to provide a requested multimedia service to a subscriber. A data link layer device is a device, such as a switch or customer premises equipment (CPE) device, that operates within data link layer of the Open Systems Interconnection (OSI) reference model, i.e., the second layer of the OSI reference model. CPE devices may be, for example, modems, wireless access points, or switches. The network layer device may send control messages to the data link layer device to dynamically configure a control object stored by the data link layer device, and the data link layer device may provide data link layer functionality based on the configuration of the control object.

For example, an SE router may control the performance of multicast elaboration, i.e., the replication and forwarding of multicast packets, by a switch or an access multiplexer, e.g., a Digital Subscriber Line Access Multiplexer (DSLAM). Upon receiving a multicasting join/leave message identifying a multicast stream, e.g., an Internet Group Management Protocol (IGMP) host membership report, from a subscriber device, the SE router sends a control message to the switch to dynamically configure multicast filter information maintained by the switch in accordance the multicasting join/leave message.

The SE router may associate the requested multicast stream with, for example, an Asynchronous Transfer Mode (ATM) virtual circuit (VC), and encapsulate and forward packets for the requested multicast stream to the data link layer device on the associated VC. The control message sent to the switch may identify the VC associated with the multicast stream and the requesting subscriber device. In response to the control message, the switch may dynamically configure the multicast filter information by associating, e.g., "cross-connecting," the VC that is associated with the multicast stream with a VC between the subscriber device and the switch. The switch may select one of a number of free VCs to the subscriber device that are designated for multicast traffic. The control message may be sent on a control VC that is dedicated to control message traffic.

In some embodiments, an SE router is used by the NSP to provide some multicast streams to all subscribers to a multimedia service, and other, premium multicast streams to only to subscribers of a premium service. In such embodiments, the SE router may maintain information classifying multicast streams as either premium or non-premium, and information indicating whether subscribers are authorized to receive premium multicast streams. Upon receiving a multicasting join message requesting a multicast stream from a subscriber device, the SE router may determine whether the requested stream is a premium or non-premium, and whether the subscriber is authorized to receive the requested stream.

In embodiments where an SE router differentiates between premium and non-premium multicast streams, the SE router may handle the replication and forwarding of packets for premium multicast streams differently than for non-premium multicast streams. For example, the SE router may replicate and forward non-premium multicast streams on a per subscriber basis, and premium multicast streams on a per switch basis. For premium multicast streams, the SE router controls the performance of multicast elaboration by switches, as described above, such that the multicast streams are appropriately delivered to requesting subscribers. Further, the premium multicast streams may be delivered to switched on dedicated VCs.

An SE router may also control packet forwarding performed by a switch or other CPE device to facilitate packet transmission according to a Quality of Service (QoS) class requested for a packet flow. The SE router may receive a request from a subscriber device for the packet flow, such as a Voice over Internet Protocol (VoIP) call, with a particular QoS class. The SE router determines whether a subscriber associated with the subscriber device is authorized for the QoS class, and retrieves QoS information describing the requested QoS class. The SE router sends a control message including at least some of the QoS information to dynamically configure a QoS profile for a layer-2 link that is maintained by the switch or CPE device. The layer-2 link is a layer-2 link between the switch or CPE device and the subscriber device. By dynamically configuring the QoS profile for the layer-2 link, the SE router causes the switch or CPE device to configure the layer-2 link such that the requested QoS level is facilitated. The switch or CPE device may, for example, preferentially queue packets for the packet flow to increase packet throughput for the packet flow on the layer-2 link.

An SE router may also send a control message to control packet forwarding performed by a switch or other CPE device in order to provide multimedia services for a subscriber according a service profile. The SE router may detect activation of an account for the subscriber by receiving an indication of physical connection of a CPE device to a network. The SE router may retrieve service profile information for the subscriber, and send control messages to the switch or CPE device including at least some of the service profile information to dynamically configure a service profile maintained by the switch or CPE device. The service profile information maintained by the switch or CPE device may include a QoS profile for a layer-2 link between the switch or CPE device and the subscriber device.

In one embodiment, a method comprises receiving a request for a multimedia service from a subscriber device, and dynamically configuring a control object stored by a data link layer device to control the data link layer device to provide data link layer functionality in accordance with the request.

In another embodiment, a network layer device comprises a control unit that receives a request for a multimedia service from a subscriber device, and dynamically configures a control object stored by a data link layer device to control the data link layer device to provide data link layer functionality in accordance with the request.

In another embodiment, a computer-readable medium comprises instructions that cause a programmable processor to receive a request for a multimedia service from a subscriber device, and dynamically configure a control object stored by a data link layer device to control the data link layer device to provide data link layer functionality in accordance with the request.

In another embodiment, a method comprises storing a control object, and receiving a control message from a network layer device, the control message sent by the network layer device in response to a request for a multimedia service send from a subscriber device to the network layer device. The method further comprises dynamically configuring the control object based on the control message, and providing data link layer functionality in accordance with the requested multimedia service based on the configuration of the control object.

In another embodiment, a data link layer device comprises a control unit to store a control object and receive a control message from a network layer device, the control message sent by the network layer device in response to a request for a multimedia service send from a subscriber device to the network layer device. The control unit dynamically configures the control object based on the control message, and provides data link layer functionality in accordance with the requested multimedia service based on the configuration of the control object.

In another embodiment, a computer-readable medium comprises instructions that cause a programmable processor to store a control object and receive a control message from a network layer device, the control message sent by the network layer device in response to a request for a multimedia service send from a subscriber device to the network layer device. The medium further comprises instructions that cause a programmable processor to dynamically configure the control object based on the control message, and provide data link layer functionality in accordance with the requested multimedia service based on the configuration of the control object.

In another embodiment, a system comprises a network layer device that receives a multicasting protocol message identifying a multicast stream from a subscriber device, and a data link layer device that receives the multicast stream from the network layer device. The data link layer device replicates and forwards the multicast stream to the subscriber device under the control of the network layer device.

In another embodiment, a method comprises maintaining classification information for multicast streams within a network layer device, and dynamically configuring multicast filter information stored by a data link layer device based on the classification information.

In another embodiment, a network layer device comprises a control unit that maintains classification information for multicast streams, and dynamically configures multicast filter information stored by a data link layer device based on the classification information.

In another embodiment, a method comprises storing a quality of service profile associated with a subscriber within a network layer device, and dynamically configuring a quality of service profile for a layer-2 link between a data link layer device and a subscriber device, the quality of service profile stored by the data link layer device. The quality of service profile may control the data link layer device to forward packets for the subscriber based on the subscriber quality of service profile stored by the network layer device.

In another embodiment, a network layer device comprises a control unit to store quality of service information associated with a subscriber, and dynamically configure a quality of service profile for a layer-2 link between a data link layer device and a subscriber device associated with the subscriber based on the quality of service profile associated with the subscriber, the quality of service profile for the layer-2 link stored by a data link layer device.

The invention may provide one or more advantages. In general, by controlling the provision of data link layer functionality by a data link layer device, a network layer device may enhance the provision of multimedia services to subscribers, and/or reduce the burden associated with providing these services from the perspective of the NSP or the network layer device.

For example, by controlling the performance of multicast elaboration by a data link layer device, the network layer device is able to provide multicast streams to subscriber devices while only replicating the streams on a per-switch basis. Consequently, the network layer device may have a reduced processing burden associated with providing multicast streams when compared to conventional network devices, and may consume less bandwidth on the media that couple the network device to data link layer devices. Further, by differentiating the manner in which premium and non-premium streams are replicated and forwarded to subscribers, e.g., delivering premium multicast streams on a per data link layer device basis and to data link layer devices via dedicated paths, the network layer device may facilitate provision of premium streams with a greater QoS than non-premium streams.

As another example, by controlling data link layer device to facilitate transmission of packets according to a Quality of Service class for particular packet flows, or according to general Quality of Service class a indicated by subscriber service profiles, a network layer device may improve the overall Quality of Service provided to subscribers. Further, by providing subscriber service profile information to data link layer devices, a network layer device may streamline the processes of initializing a multimedia service account.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
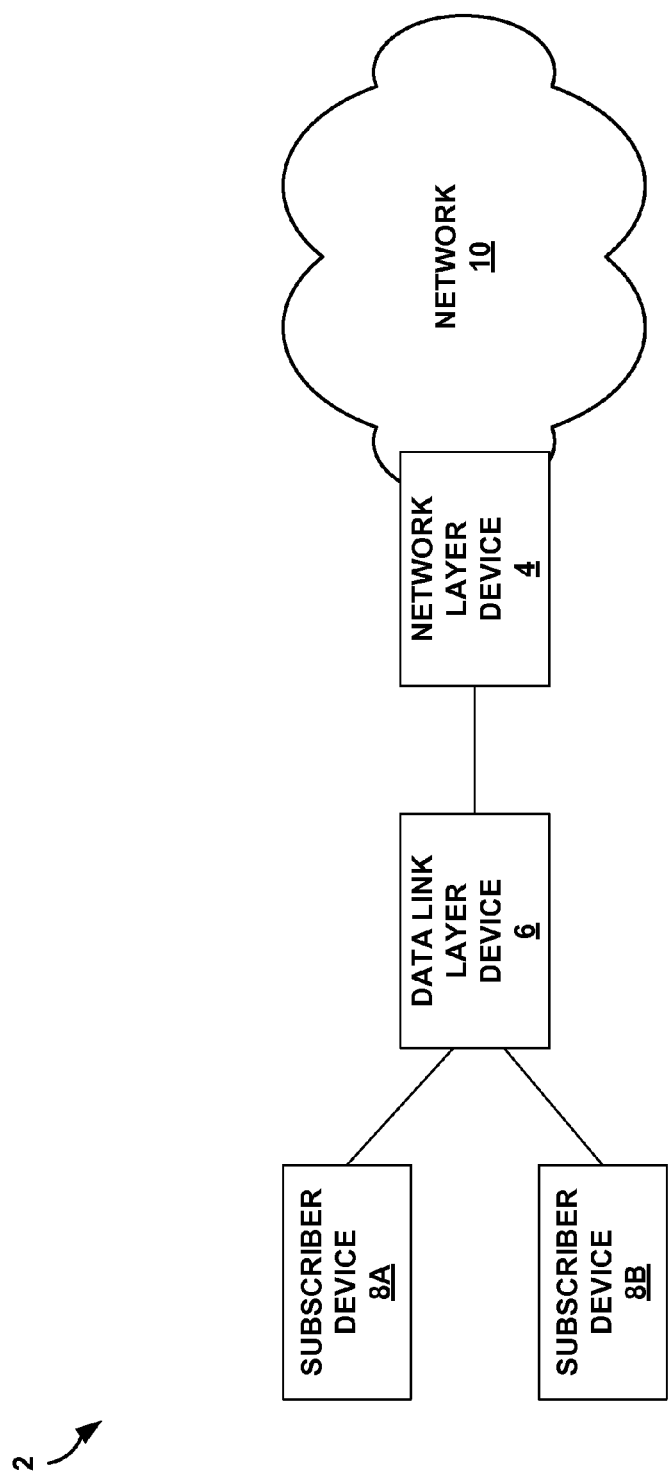
FIG. 1 is a block diagram illustrating an example multimedia networking environment in which a network layer device controls provision of data link layer functionality by a data link layer device consistent with the principles of the invention.

FIG. 1 is a block diagram illustrating an example multimedia networking environment 2 in which a network layer device 4 controls provision of data link layer functionality by a data link layer device 6 consistent with the principles of the invention. Network layer device 4 is a device, such as a router, that operates within the third layer, i.e., the network layer, of the Open Systems Interconnection (OSI) reference model. Data link layer device 6 is a device, such as a switch, an access multiplexer or a customer premises equipment (CPE) device, that operates within the second layer of the OSI reference model, i.e., the data link layer. CPE devices may be, for example, modems, wireless access points, or switches.

Network layer device 4 and data link layer device 6 may, as shown FIG. 1, couple subscriber devices 8A and 8B (collectively "subscriber devices 8") to a network 10. For exemplary purposes, network 10 is described in reference to a packet-based network, such as the Internet. Network 10 may include a number of autonomous systems (not shown), each of which include a variety of devices, such as routers and switches (not shown), to route packets across network 10. In particular, network 10 includes an autonomous system associated with a Network Service Provider (NSP) that provides multimedia services to subscribers associated with subscriber devices 8, i.e., a provider network.

The NSP maintains network layer device 4 to provide subscriber devices 8 with access to network 10, and to provide multimedia services to the subscribers via subscriber devices 8. Consequently, where network layer device 4 is a router, network layer device 4 may be referred to as a "service edge" (SE) router. Network layer device 4 may act as a Broadband Remote Access Server (B-RAS) for subscriber devices 8. Subscriber devices 8 may be, for example, personal computers, servers, laptop computers, personal digital assistants (PDAs), or network-enabled appliances, such as digital television set-top boxes.

In accordance with the principles of the invention, network layer device 4 sends control messages to data link layer device 6 to control the provision of data link layer functionality by data link layer device 6. The control messages contain information used by data link layer device 6 to dynamically update a control object maintained by data link layer device 6, which controls the provision of data link layer functionality by data link layer device 6. The control messages may be "in-band," so that they are more quickly processed by data link layer device 6. For example, the control messages may be conform to a network layer protocol, e.g., packets communicated via the Internet Protocol (IP).

The invention may be applied in a variety of environments and with a variety of types of data link layer devices 6. For example, as described above, data link layer device 6 may a switch or a CPE device. The invention may be applied in, for example, Digital Subscriber Line (DSL) or broadband cable environments, and data link layer device 6 may be a Digital Subscriber Line Access Module (DSLAM) or a Cable Modem Termination System (CMTS). In such embodiments, communication between network layer device 4, data link layer device 6, and subscriber devices 8 may be via Asynchronous Transfer Mode (ATM) Virtual Circuits (VCs), or a combination of ATM VCs and Virtual Local Area Networks (VLANs).

In other embodiments, data link layer device 6 may be an Ethernet Bridge, and communication between network layer device 4, data link layer device 6, and subscriber devices 8 may be via Ethernet frames in accordance with the IEEE 802.3 family of standards. In some embodiments, as will be described in greater detail below, the content of the control messages sent from network layer device 4 to data link layer device 6, and of the information maintained by network layer device 4 and data link layer device 6 to provide network layer functionality, may vary depending on the environment in which the invention is applied. For example, the content of the messages and information may vary based on the type of data link layer device 6 and mode of communication used by network layer device 4, data link layer device 6, and subscriber devices 8.

The NSP uses network layer device 4 to provide a variety of multimedia services to the subscribers associated with subscriber devices 8. For example, the NSP may allow the subscribers to receive multicast streams on subscriber devices 8 via network layer device 4. The NSP may also use network layer device 4 to provide packet transmission according to a Quality of Service (QoS) class for particular unicast packet flows, such as Voice over IP (VoIP) calls, for the subscribers. As another example, the NSP may use network layer device 4 to manage service profiles that vary from subscriber to subscriber. A service profile may define a one or more general QoS classes for all inbound or outbound packet traffic for a particular customer.

By controlling data link layer device 6, network layer device 4 may enhance these services, and/or reduce the burden associated with providing these services from the perspective of the NSP or network layer device 4. For example, network layer device 4 may control the performance of multicast elaboration by data link layer device 6, reducing the burden of delivering multicast streams to subscriber devices 8. As another example, network layer device 4 may control packet forwarding by data link layer device 6 to facilitate a QoS class for particular packet flows, or a general QoS class consistent with respective subscriber profiles. By controlling data link layer device 6 to facilitate QoS classes, the overall QoS provided to subscribers may be improved.

Figure 2:
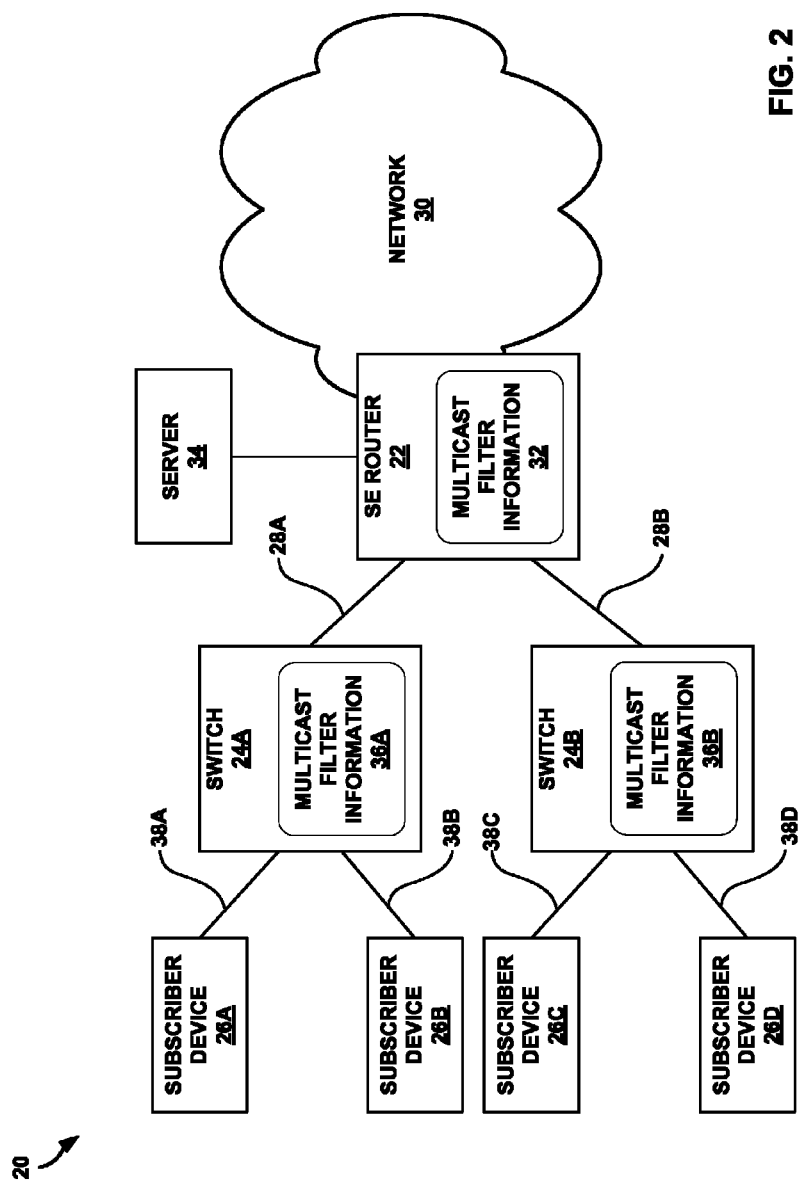
FIG. 2 is a block diagram illustrating an example multimedia networking environment in which a service edge router controls the performance of multicast elaboration by data link layer devices consistent with the principles of the invention.

FIG. 2 is a block diagram illustrating an example multimedia networking environment 20 in which an SE router 22 controls the performance of multicast elaboration by switches 24A and 24B (collectively "switches 24") consistent with the principles of the invention. Multicast elaboration includes the replication and forwarding of multicast packets. Multicasting, including multicast elaboration, is typically performed in accordance with IP multicasting protocols by devices, such as SE router 22, that operate within network layer of the OSI reference model.

Switches 24 operate within the second layer of the OSI reference model, i.e., the data link layer. Conventional switches do not process IP multicast control packets, i.e. Internet Group Management Protocol (IGMP) membership report packets. Further, conventional data link layer switches, although capable of performing multicast elaboration, typically do not perform multicast elaboration for the provision of multicast streams in a multimedia networking environment. Consequently, a conventional SE router that provides a multicast stream to multiple subscribers must replicate the stream for each subscriber.

By controlling the performance of multicast elaboration by switches 24 consistent with the principles of the invention, SE router 22 is able to provide multicast streams to subscriber devices 26A-D (collectively "subscriber devices 26") while only replicating the streams on a per-switch basis. Consequently, SE router 22 may have a reduced processing burden associated with providing multicast streams when compared to conventional SE routers. Further, SE router 22 may consume less bandwidth on the media 28A and 28B (collectively "media 28") that couple SE router 22 to switches 24 while providing multicasting streams than a conventional SE router would consume.

As illustrated in FIG. 2, SE router 22 is a router within a computer network 30. Network 30 is a packet-based network, such as the Internet. Network 30 may include a number of autonomous systems (not shown), and devices, such as additional routers and switches (not shown), to route packets across network 30. Network 30 includes an autonomous system (not shown) associated with a Network Service Provider (NSP) that maintains SE router 22, i.e., a provider network.

The NSP provides multimedia services to subscribers associated with subscriber devices 26 via SE router 22. For example, the NSP makes multicast streams available to the subscribers, and the subscribers receive requested multicast streams on their associated subscriber devices 26. Subscriber devices 26 may be, for example, personal computers, laptop computers, handheld computers, or television set-top boxes. Multicast streams may include, for example, video, audio, data, or any combination thereof.

SE router 22 maintains multicast filter information 32 that describes how received multicast packets should be replicated and forwarded to one or more of subscriber devices 26. SE router 22 updates multicast filter information based on messages received from subscriber devices 26 that indicate a desire to join or leave multicast groups, i.e., to receive or stop receiving multicast streams. For example, when a subscriber associated with subscriber device 26A requests a multicast stream, subscriber device 26A sends a multicast join message, e.g. an IGMP host membership report requesting membership in the multicast group associated with the requested multicast stream, to a neighboring router, i.e., SE router 22. As a data link layer device, switch 24A forwards the join message to SE router 22 without processing the join message.

SE router may act as a B-RAS for subscriber devices 26. Consequently, SE router 22 may authenticate the subscriber associated with subscriber device 26A, and determine whether the subscriber is authorized to receive the multicast stream. A server 34 available on network 30 may store information identifying subscribers and indicating what multicast streams the subscribers are authorized to receive. When a subscriber associated with one of subscriber devices 26 logs on or otherwise activates its multimedia service account, SE router 22 may query server 34 to authenticate the subscriber and receive authorization information for the subscriber. Server 34 may, for example, be a Remote Authentication Dial-In User Service (RADIUS) server.

When SE router 22 receives a multicast join/leave message from one of subscriber devices 26, SE router 22 accesses the authentication and authorization information to verify that the user is authenticated and authorized to receive the requested multicast stream, SE router 22 updates multicast filter information 32 to indicate that the requested multicast stream is to be replicated and forwarded to subscriber device 26A. Because SE router 22 controls the performance of multicast elaboration by switches 24, SE router 22, as discussed above, need only replicate multicast streams on a per-switch basis. Thus, SE router 22 determines whether multicast filter information 32 indicates that the associated multicast stream is currently forwarded to switch 24A, i.e., if subscriber device 26B is currently receiving the requested multicast stream, and if not, updates multicast elaboration information 32 to indicate that the associated multicast stream is to be forwarded to switch 24A. If SE router 22 is not currently receiving the requested multicast stream, SE router may send a Protocol Independent Multicast (PIM) join message to a neighboring, e.g., next-hop, router requesting the multicast stream.

In order to perform multicast elaboration, each of switches 24A and 24B maintains multicast filter information 36A and 36B, respectively, that describes how received multicast packets, or more particularly the data link layer frames or cells containing such multicast packets, should be replicated and forwarded to one or more of subscriber devices 26. Switches 24 dynamically configure multicast filter information 36 based on control messages received from SE router 22. For example, when SE router 22 receives the message from subscriber device 26A requesting the multicast stream and updates multicast filter information 32 as discussed above, SE router 22 will also send a control message to switch 24A indicating that subscriber device 26A is to receive the multicast stream.

Based on the control message, switch 24A will dynamically configure multicast filter information 36A to indicate that the frames or cells containing packets for the multicast received from SE router 22 are to be replicated and forwarded to subscriber device 26A. The control messages may be IP packets transmitted within data link layer frames or cells. The control messages may be in-band control messages, allowing the messages to be quickly received and processed by switches 26.

Media 38A-D (collectively "media 38") that couple switches 24 to subscriber devices 26 may be Digital Subscriber Lines (DSLs), and switches 24 may take the form of DSLAMs. Media 28 that couple switches 24 to SE router 22 may be, for example, take the form of optical links complying with the Synchronous Optical Network (SONET) or Synchronous Digital Hierarchy (SDH) standards.

In such embodiments, communication between SE router 22, switches 24, and subscriber devices 26 may be according to any of a number of data link layer communication modes. For example, communication between SE router 22, switches 24, and subscriber devices 26 may be according to ATM. Each of subscriber devices 26 may send ATM cells to and receive ATM cells from its respective switch 24 via one or more ATM VCs, and each of switches 24 may send ATM cells to and receive ATM cells from SE router 22 via one or more VCs. The VCs may include VCs dedicated to transmission of cells containing unicast packet traffic, and VCs dedicated to transmission of cells containing multicast packet traffic. A VC dedicated to communication of control messages to cause switches to perform multicast elaboration as described above may be established between SE router 22 and each of switches 24.

In some embodiments where switches 24 are DSLAMs, media 28 may take the form of optical fiber that supports Gigabyte Ethernet (G-Eth) communication as specified in the IEEE 802.3 family of standards. In such embodiments, instead of ATM cells and VCCs, switches 24 may send frames to and receive frames from SE router 22 via one or more VLANs established between switches 24 and SE router 22. The VLANs may include VLANs dedicated to transmission of frames containing unicast packet traffic, and VLANs dedicated to transmission of frames containing multicast packet traffic. A VLAN dedicated to communication of control messages to cause switches to perform multicast elaboration as described above may be established between SE router 22 and each of switches 24.

In some embodiments, switches 24 are Ethernet bridges. In such embodiments, media 28 may support G-Eth communication, and media 38 may support Metro Ethernet communication as specified in the IEEE 802.3 family of standards. In such embodiments, SE router 22, switches 24 and subscriber devices 26 may send, receive and/or forward IP packet traffic within frames according to the IEEE 802.3 family of standards.

In other embodiments, media 38 takes the form of coaxial cable, and switches 24 take the form of a CMTS. In such an embodiment, communication between SE router 22, switches 24 and subscriber devices 26 may be via ATM VCCs, in accordance with the Data Over Cable Service Interface Specifications (DOCSIS). As will be described in greater detail below, the content of control messages used by SE router 22 to cause switches 24 to perform multicast elaboration and multicast filter information 32 and 36 maintained by SE router 22 and switches 24 depends of the type of switches 24, i.e. DSLAM, Ethernet bridge, CMTS, and the data link layer communication mode or modes employed by SE router 22, switches 24 and subscriber devices 26, i.e., ATM VCs, VLANs, or communication according to the IEEE 802.3 family of standards.

In some embodiments, SE router 22 may be used by the NSP to provide some multicast streams to all subscribers associated with subscriber devices 26, and other, premium multicast streams to only to subscribers to a premium service. In such embodiments, as will be described in greater detail below, SE router 22 may maintain information classifying multicast streams as either premium or non-premium, and information indicating whether subscribers are authorized to receive premium multicast streams. Upon receiving a multicasting join message requesting a multicast stream from one of subscriber devices 26, SE router 22 may determine whether the requested stream is a premium or non-premium, and whether the subscriber associated with the requesting one of subscriber devices 26 is authorized to receive the requested stream.

In such embodiments, SE router 22 may handle the replication and forwarding of packets for premium multicast streams differently than for non-premium multicast streams. For example, the SE router 22 may replicate and forward non-premium multicast streams on a per subscriber basis, and premium multicast streams on a per switch basis, e.g. control the performance of multicast elaboration by switches 24 as described above. Further, the premium multicast streams may be delivered to switches 24 on dedicated VCs or VLANs, while all non-premium streams are delivered to switches 24 on VCs or VLANs shared with unicast packet traffic.

The configuration of network environment 20 illustrated in FIG. 2 is merely exemplary. For example, SE router 22 may be coupled to any number of switches 24. Further, switches 24 may each be coupled to any number of subscriber devices 26. Additionally, although not illustrated in FIG. 2, one or more of subscriber devices 26 may be coupled to one of switches 24 via one or more CPE devices, such as one or more modems, wireless access points, or switches.

Figure 3:
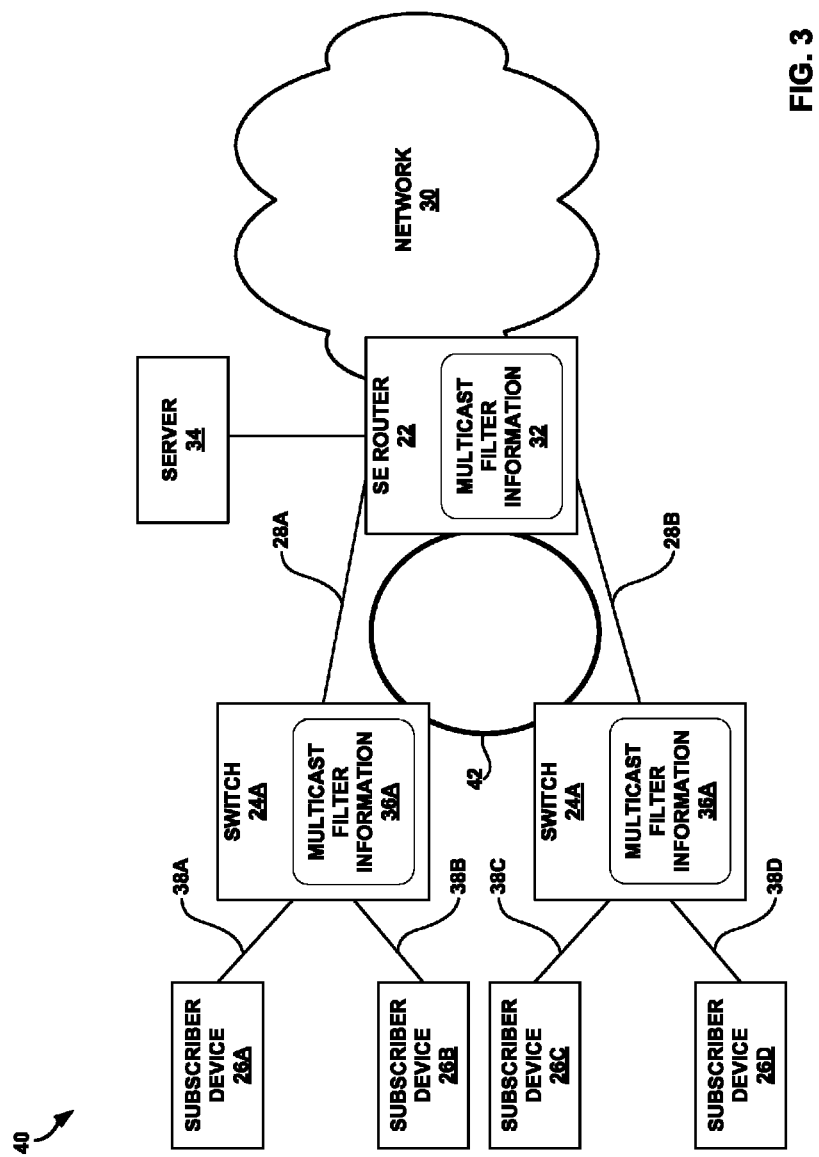
FIG. 3 is a block diagram illustrating another example networking environment in which a service edge router controls the performance of multicast elaboration by data link layer devices consistent with the principles of the invention.

FIG. 3 is a block diagram illustrating another example networking environment 40 in which SE router 22 controls the performance of multicast elaboration by switches 24 consistent with the principles of the invention. In the illustrated example environment, SE router 22 and switches 24 are coupled in a ring topology via an additional medium 42. Medium 42 may be an optical link complying with the SONET or SDH standards. Communication between SE router 22 and switches 24 on medium 42 may be, for example, via one or more ATM VCs or VLANs. Communication on medium 42 may be unidirectional.

Medium 42 is used by SE router 22 to forward multicast traffic to switches 24. Use of medium 42 to forward multicast traffic allows SE router 22 to forward a single copy of each multicast stream currently requested by one of subscriber devices 26, rather than replicating the streams on a per-switch basis. Switches 24 forward cells or frames received on medium 42 that contain multicast packets to one or more of subscriber devices 26 based on multicast elaboration information 36, and also forward the cells or frames along the ring formed by medium 42. If none of the subscriber devices 26 coupled to one of the switches 24 is receiving the multicast stream associated with a received cell or frame, that switch 24 forwards the cell or frame on medium 42.

Figure 4:
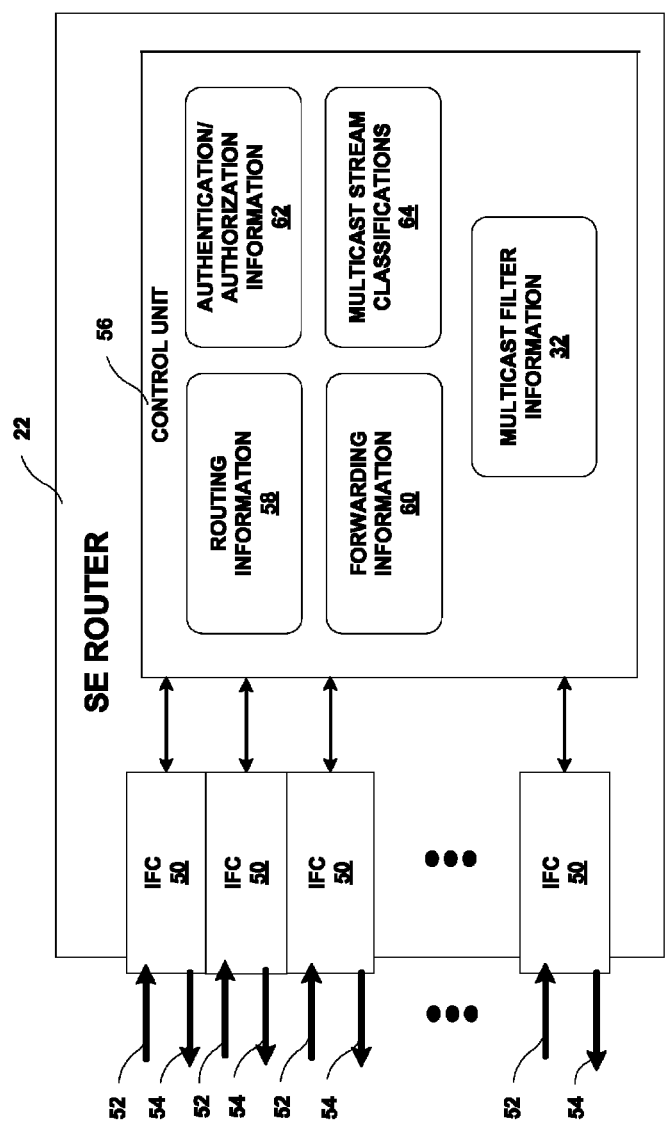
FIG. 4 is a block diagram illustrating an example service edge router that controls the performance of multicast elaboration by data link layer devices.

FIG. 4 is a block diagram further illustrating SE router 22. SE router 22 includes interface cards 50A-50N ("IFCs 50") that receive and send packet flows via network links 52 and 54, respectively. IFCs 50 are typically coupled to network links 52, 54 via a number of interface ports (not shown). SE router 22 may include a chassis (not shown) having a number of slots for receiving a set of cards, including IFCs 50. Each card may be inserted into a corresponding slot of a chassis for electrically coupling the card to a control unit 56 via a bus, backplane, or other electrical communication mechanism.

In general, SE router 22 receives inbound packets from network links 52, determines destinations for the received packets, and outputs the packets on network links 54 based on the destinations. More specifically, upon receiving an inbound packet via one of inbound links 52, a respective one of IFCs 50 relays the packet to control unit 56. In response, control unit 56 reads a block of data from the packet, referred to as the "key," which may include an IP address of the destination for the packet, and forwards the packet based on the key.

SE router 22 maintains routing information 58 that describes the topology of network 30, i.e., the routes through network 30. SE router 22 exchanges routing information with other routing devices within network 30, thereby learning routes through the network. SE router 22 may exchange routing information with other routing devices in accordance with one or more routing protocols, such as the Border Gateway Protocol (BGP).

Control unit 56 generates forwarding information 60 based on routing information 58. Control unit 56 selects routes for packets, e.g., determines which links 54 to forward the packets on, by comparing the keys of the packets to forwarding information 60. Forwarding information 60 includes information identifying which of links 54, and in some embodiments which VC or VLAN to forward IP unicast packets destined for one of subscriber devices 26 on.

Control unit 56 also maintains multicast filter information 32, and authentication/authorization information 62 received from server 34 (FIGS. 2 and 3), as discussed above. Control unit 56 receives multicast join/leave messages, e.g., IGMP host membership reports, from subscriber devices 26 via links 52 and IFCs 50. A multicast join/leave messages includes a source IP address of the requesting one of subscriber devices 26, a destination IP address identifying the multicast group associated with requested multicast stream, and the requested action, i.e., join or leave. Control unit 56 updates multicast filter information 32 based on received join/leave messages, and replicates and forwards received multicast packets based on multicast filter information 32.

For example, when one of subscriber devices 26 requests a multicast stream, and if the requesting one of subscriber devices 26 is authenticated and authorized to receive the requested stream as determined by checking authentication/authorization information 62, control unit 56 updates multicast filter information 32 to associate the IP address of the requesting one of subscriber devices 26 with the IP address of the multicast group for the requested stream. Control unit 56 also identifies the VC for the requesting one of destination devices 26 based on its IP address, and associates the VC with the IP address of the multicast group for the requested stream. Control unit 56 also determines which of links 54 to forward multicast packets of the requested stream on to reach the requesting one of destination devices 26, and associates the determined link with the IP address of the multicast group for the requested stream within multicast elaboration information 32. In some embodiments, control unit 56 also identifies a preconfigured VC or VLAN associated with the IP address for the requested stream, or dynamically associates a VC or VLAN with the IP address for the requested stream. Control unit 56 forwards multicast packets of the requested stream on the associated VC or VLAN.

In other embodiment, where switches 24 take the form of Ethernet bridges, control unit 56 identifies a Media Access Control (MAC) address for the requesting one of subscriber devices 26 from the header of the frame in which the multicast join/leave message was encapsulated, and associates the MAC address with the IP address of the multicast group for the requested multicast stream. In such embodiments, control unit 56 further assigns a "multicast MAC address" for the multicast stream, and associates the multicast MAC address with the IP address of the multicast group for the requested stream, and forwards multicast packets within frames that include the multicast MAC address.

If SE router 22 is not currently receiving multicast packets for the requested stream, control unit may send a PIM join message requesting the stream to a neighboring router via one of links 54. As discussed above, SE router 22 replicates and forwards multicast packets on a per-switch basis. Consequently, where SE router 22 is already forwarding multicast packets to the one of switches 24 that couples the requesting one of subscriber devices 26 to SE router 22, control unit 56 may simply associate the IP address of the requesting one of subscriber devices 26 with the IP multicast group address of the requested stream, and a previously determined link 54 to the switch 24, and the associated VC or VLAN that is being used to transmit the multicast stream to the switch 24. In embodiments where switches 24 take the form of Ethernet bridges, control unit may associate the IP address and MAC address of the requesting one of subscriber devices with a previously determined link 54 to the switch 24, and a previously assigned multicast MAC address for the multicast stream.

In addition to replicating received multicast packets on a per-switch basis as indicated by multicast filter information 32, control unit 56 encapsulates multicast packets to forward the multicast packets to switches 24. For example, control unit 56 may encapsulate multicast packets with ATM cell headers or Ethernet frame headers for transmission to switches 24 on VCs or VLANs associated with the IP source address of the multicast group as indicated within multicast filter information 32. Where switches 24 take the form of Ethernet bridges, control unit 56 encapsulates multicast packets with Ethernet frame headers that include the assigned multicast MAC address as indicated within multicast filter information 32.

In order to control the performance of multicast elaboration by switches 24, i.e., to control switches 24 to complete the multicast elaboration of multicast packets received by SE router 22 and forwarded to switches 24 on a per-switch basis, control unit 56 sends control messages to switches 24. The control messages may be in-band, and control unit 56 may send the control messages to switches 24 via dedicated control VCs or VLANs. Further, the content of the control messages will, as mentioned above, depend on the type of switches 24, i.e. DSLAM, Ethernet bridge, or CMTS, and the data link layer communication mode or modes employed by SE router 22, switches 24 and subscriber devices 26, i.e., ATM VCs, VLANs, or communication according to the IEEE 802 standards.

For example, where a switch 24 is a DSLAM or CMTS, and communication between SE router 22 and the switch 24 is via VCs or VLANs, a control message sent by control unit 56 to the switch 24 in response to a multicast join/leave message received from one of subscriber devices 26 identifies the VC or VLAN that packets for the requested multicast stream will be sent to the switch 24 on, the VC associated with the requesting one of subscriber devices 26, and the requested action, i.e. join or leave. Where a switch 24 is an Ethernet bridge, a control message sent by control unit 56 to the switch 24 in response to a multicast join/leave message received from one of subscriber devices 26 identifies the MAC address assigned to the requested multicast that will be included in the header of frames containing multicast packets for the requested multicast, the MAC address of the requesting one of subscriber devices 26, and the requested action, i.e. join or leave. As will be described in greater detail below with reference to FIG. 5, switches 24 dynamically configure multicast filter information 36 maintained by switches 24 based on the control messages received from SE router 22.

As described above, SE router 22 may by used by an NSP to differentiate between premium and non-premium multicast streams, and may handle the replication and forwarding of premium multicast streams differently than for non-premium multicast streams. Specifically, SE router 22 may replicate and forward premium multicast streams on a per-switch basis, and control performance of multicast elaboration by switches 24, as described above, for premium multicast streams, while replicating and forwarding non-premium multicast streams on a per-subscriber basis. Further, in such embodiments, delivery via VCs dedicated to traffic for an associated multicast stream may be reserved for premium multicast streams In such embodiments, control unit 56 may maintain information classifying multicast streams a premium or non-premium, e.g., multicast stream classifications 64. When control unit 56 receives a multicast join message from one of subscriber devices 26, control unit 56 determines whether the requested multicast stream is premium or non-premium based on multicast stream classifications 64. Control unit 56 determines whether to configure multicast filter information 32 and send a control message to one of switches 24 in the manner described above based on the determination.

Control unit 56 may include one or more microprocessors, digital signal processors (DSPs), Application Specific Integrated Circuits (ASICs), Field Programmable Gate Arrays (FPGAs), or other logic circuitry. Control unit 56 may include memory (not shown) that stores computer-readable program instructions that cause control unit 56 to perform the functions ascribed to it herein. The memory may include any magnetic, optical, or electrical media, such as a Random Access Memory (RAM), Read Only Memory (ROM), hard disk, CD-ROM, or Electronically Erasable Programmable ROM (EEPROM). Control unit 56 may maintain routing information 58, forwarding information 60, authentication/authorization information 62, multicast stream classifications 54, and multicast elaboration information 32 in memory in the form of one or more tables, databases, link lists, radix trees, databases, flat files, or any other data structures.

Figure 5:
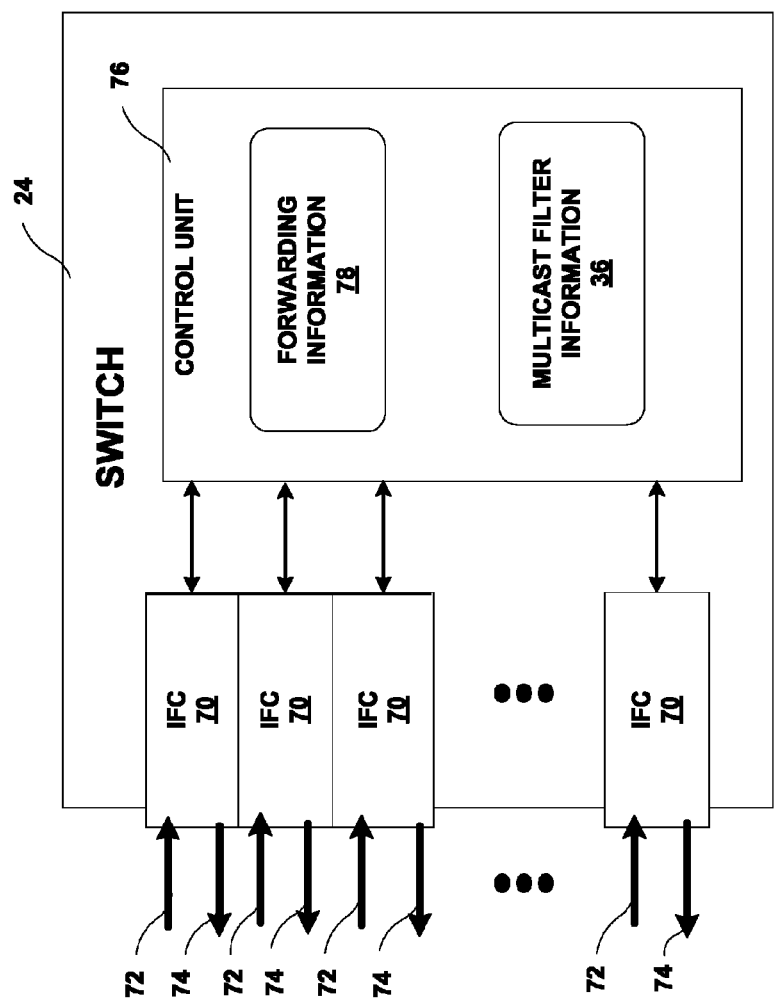
FIG. 5 is a block diagram illustrating an example switch that performs multicast elaboration as indicated by a router.

FIG. 5 is a block diagram illustrating an example switch 24. Switch 24 may be, for example, a DSLAM, CMTS, or Ethernet bridge, as described above. Switch 24 includes IFCs 70 that receive and send flows of ATM cells or Ethernet frames via links 72 and 74, respectively. In general, switch 24 receives cells or frames from network links 72, and forwards the cells or frames via network links 74 based on information contained in the header of the cells, frames, or encapsulated packets.

More specifically, upon receiving an inbound cell or frame, a respective one of IFCs 70 relays the cell or frame to a control unit 76. Control unit 76 identifies an appropriate outbound link 74 to forward the received cell or frame on by comparing information in the header of the cell or frame to forwarding information 78 maintained by control unit 76. In some cases, control unit may reencapsulate, i.e. modify the header, of the cell or frame to forward the cell or frame on a particular VC or VLAN indicated by forwarding information 78.

Control unit 76 maintains multicast filter information 36, and dynamically configures multicast filter information 36 based on control messages received from SE router 22. As described above, the control messages may identify the VC or VLAN that packets for the requested multicast stream will be sent to switch 24 on or the multicast MAC address assigned to the requested multicast stream by SE router 22. The control messages also identify an associated VC or the MAC address of the requesting one of subscriber devices 26, and the requested action, i.e. join or leave.

For each multicast stream, control unit 76 maintains multicast filter information 36 to include the indicated inbound VC or VLAN, or the indicated multicast MAC address. Based on the control messages received from SE router 22, control unit 76 associates the VC or MAC addresses of subscriber devices 26 that have joined the multicast with the indicated VC, VLAN, or multicast MAC address. Where switch 24 is an Ethernet bridge and control unit 76 receives Ethernet frames that include a multicast MAC address, control unit 76 replicates and forwards the frames to subscriber devices 26 based on the subscriber device MAC addresses associated with the multicast MAC address within multicast filter information 36. Switch 24 reencapsulates the replicated multicast packets with Ethernet frames headers that include the MAC address of the respective subscriber devices 26.

In embodiments where switch 24 is a DSLAM, control unit 76 maintains multicast filter information 36 that associates VCs or VLANs that deliver multicast streams with VCs associated subscriber devices 26 that receive the streams. Control unit 76 may also dynamically assign dedicated multicast VCs for subscriber devices 26 that receive the streams based on the VCs associated with the subscriber devices 26, and associates a dedicated multicast VC with each of the subscriber device VCs indicated within multicast filter information 36. In some embodiments, for each of the subscriber devices 26 that are receiving a multicast stream, control unit 76 may select one of a plurality of VCs dedicated to transmitting multicast streams to that subscriber device 26 based on availability. When control unit 76 receives ATM cells or Ethernet frames that contain multicast packets on a VC or VLAN, control unit 76 replicates the multicast packets for each of the subscriber devices 26 associated with the VC or VLAN within multicast filter information 36. Control unit 76 encapsulates the replicated multicast packets for delivery via the multicast VCs associated with VC or VLAN on which the multicast packets were received within multicast filter information 36.

Control unit 76 may include one or more microprocessors, DSPs, ASICs, FPGAs, or other logic circuitry. Control unit 76 may include memory (not shown) that stores computer-readable program instructions that cause control unit 76 to perform the functions ascribed to it herein. The memory may include any magnetic, optical, or electrical media, such as a RAM, ROM, hard disk, CD-ROM, or EEPROM. Control unit 76 may maintain forwarding information 78 and multicast elaboration information 36 in memory in the form of one or more tables, databases, link lists, radix trees, databases, flat files, or any other data structures.

Figure 6A:
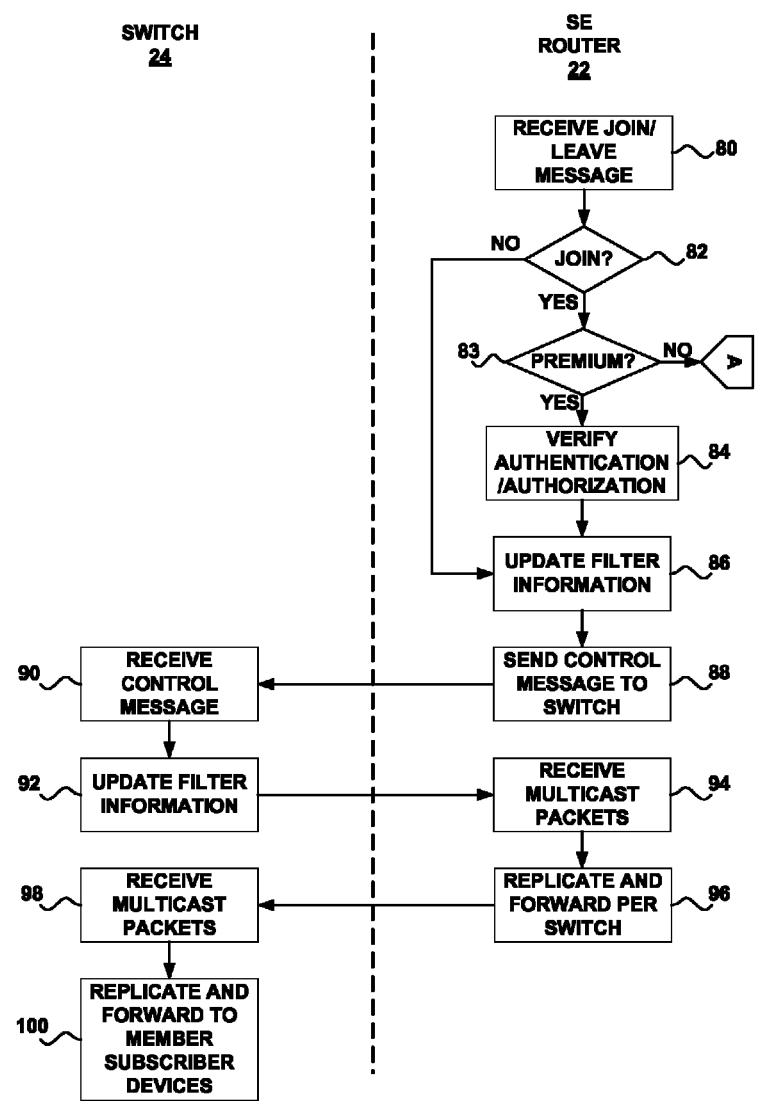
FIGS. 6A and 6B are flowcharts illustrating an example method in which a service edge router controls the performance of multicast elaboration by data link layer devices.
Figure 6B:
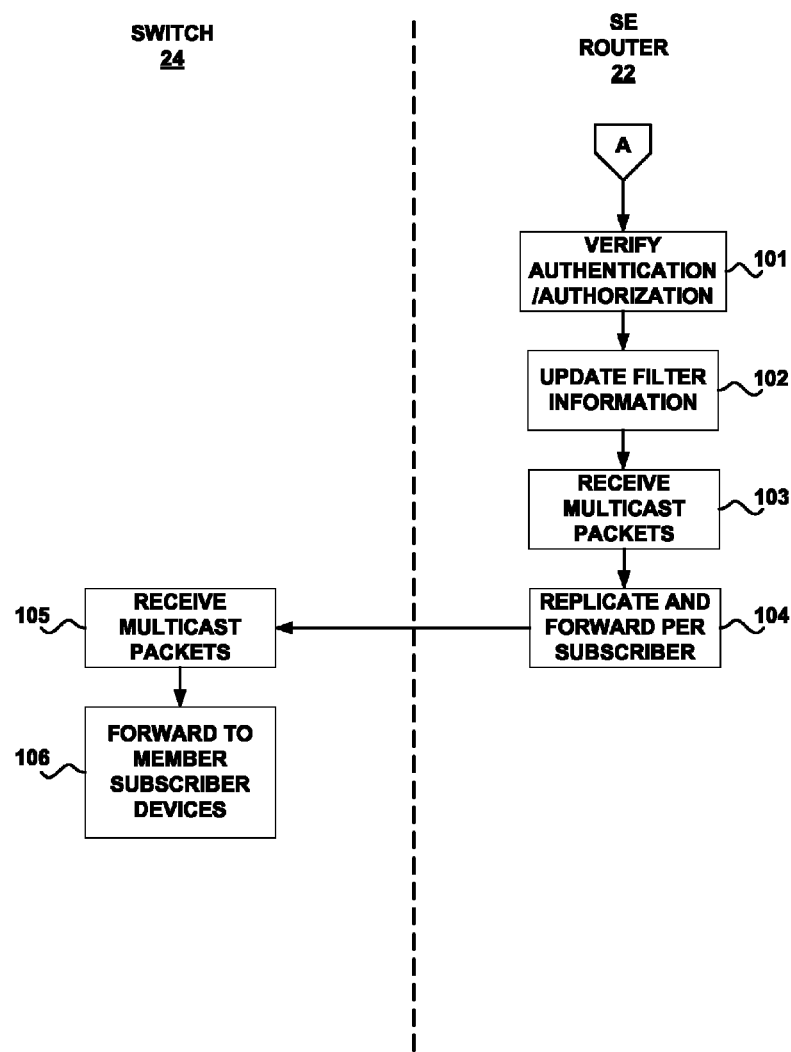

FIGS. 6A and 6B are flowcharts illustrating an example method in which SE router 22 controls the performance of multicast elaboration by a switch 24 consistent with the principles of the invention. As illustrated in FIG. 6A, SE router 22 receives a multicast join/leave message, e.g., an IGMP host membership report, from a subscriber device 26 (80). If SE router 22 determines that the message is a join message (82), SE router 22 checks multicast stream classifications 64 to determine whether the requested multicast stream is premium or non-premium (83). If the stream is premium, SE router checks authentication/authorization information 62 received from server 34 to verify that the subscriber associated with the requesting subscriber device 26 is authenticated associated authorized to receive the multicast stream requested in the join message (84), e.g., has subscribed to a level of multimedia service that includes receipt of premium multicast streams. If the subscriber is authenticated and authorized, or if SE router 22 determines that the message is a leave message, SE router 22 updates filter information 32 (86). SE router 22 may associate an IP address and a VC or MAC address for the requesting subscriber device 26 with a selected or previously associated VC or VLAN, or an assigned multicast MAC address, as described above.

SE router 22 sends a control message to switch 24 to dynamically update multicast filter information 36 maintained by switch 24 (88). The message includes the VC or MAC address of the requesting one of subscriber devices 26, and the requested action, i.e., join or leave. The message also may include the selected VC or VLAN, or the assigned multicast MAC address. As described above, the message may be an in-band IP message, and may be sent to switch 24 via a designated control VC or VLAN.

Switch 24 receives the control message (90), and dynamically configure multicast filter information 36 based on the control message (92). For each active multicast stream, i.e., each multicast stream that SE router 22 is currently delivering to switch 24, switch 24 associates the VC or MAC addresses of subscriber devices 26 that have requested a multicast stream with the VC or VLAN that switch 24 is receiving that multicast stream on, or with the multicast MAC address assigned to that multicast stream by SE router 22, as described above. In embodiments where switch 24 is a DSLAM, switch 24 further associates an outbound multicast-dedicated VC with each of the VCs for the requesting subscriber devices 24.

SE router 22 receives multicast packets for a multicast stream (94), and replicates and forwards the multicast packets on a per-switch basis according to multicast filter information 32 (96), as described above. To forward the multicast packets to switch 24, SE router 22 encapsulates the multicast packets for delivery via the selected VC or VLAN indicated within multicast filter information 32, or within an Ethernet frame that includes the assigned multicast MAC address for the multicast as the destination address within the header for the frame, as described above. Switch 24 receives the multicast packets (98), and replicates and forwards the multicast packets to subscriber devices 26 based on multicast filter information 36 (100).

By comparing the VC or VLAN that multicast packets arrive on, or the multicast MAC address of the Ethernet Frames containing multicast packets to multicast elaboration information, switch 24 identifies the subscriber devices 24 that are to receive the multicast packets. Switch replicates the multicast packets for each indicated subscriber device 26. Switch 24 may forward the replicated multicast packets within Ethernet frames addressed to indicated subscriber devices 26, i.e., containing MAC addresses of indicated subscriber devices 26 as the destination addresses within the headers of the frames, or may encapsulate the replicated multicast packets for delivery via VCs indicated within multicast filter information 36, as described above.

If SE router 22 determines that the requested stream is a non-premium stream (83), SE router 22 will check authentication/authorization information to verify the authentication and authorization of the subscriber (101) and update filter information 32 (102) to associate the IP address for the requesting subscriber device 26 and a common unicast VC to switch 24 with the IP address for the multicast group associated with the requested multicast stream. When SE router 22 receives packets for the requested non-premium multicast stream (103), SE router 22 replicates the multicast packets on a per-subscriber basis for forwarding on the indicated unicast VCs (104). Switch 24 receives a copy of the multicast packets per subscriber (105), and forwards them to the indicated subscriber devices without replication (106).

Figure 7:
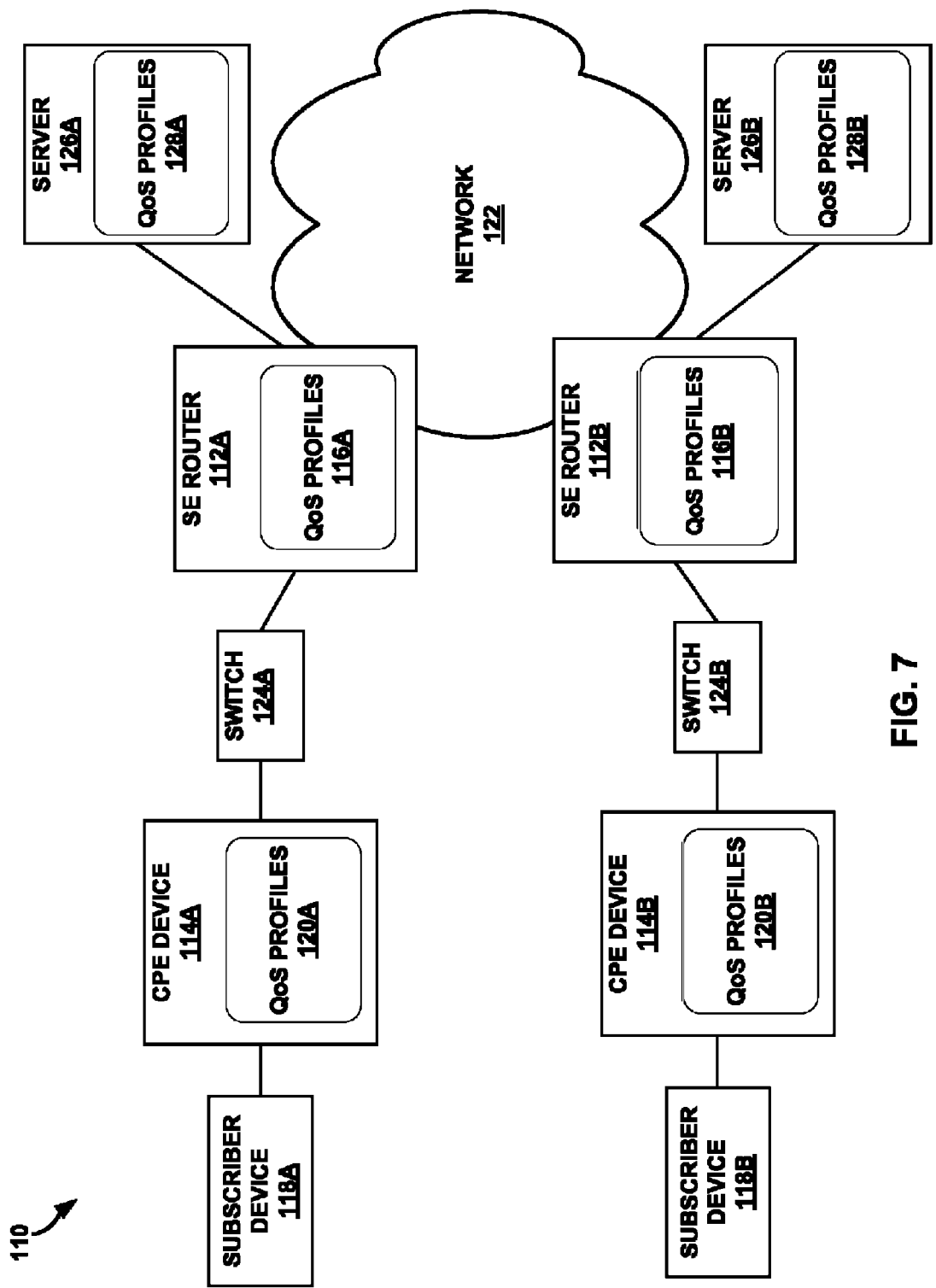
FIG. 7 is a block diagram illustrating an example multimedia networking environment in which a service edge router controls packet forwarding by a customer premises equipment device to facilitate a requested Quality of Service class for a unicast packet flow consistent with the principles of the invention.

FIG. 7 is a block diagram illustrating an example networking environment 110 in which SE routers 112A and 112B (collectively "SE routers 112") control packet forwarding by Customer Premises Equipment (CPE) devices 114A and 114B (collectively "CPE devices 114") to facilitate transmission of packets according to a requested Quality of Service (QoS) class for a unicast packet flow consistent with the principles of the invention. In general, network layer devices, such as SE routers 112, use QoS information so that an NSP that administers the network layer devices can provide subscribers a requested QoS class for a packet flow. A requested QoS class may include preferential routing of the packet flow, e.g., routing through designated or engineered packet flows to improve the speed of transmission of the packet flow and to reduce the occurrence of dropped packets from the packet flow.

SE routers 112 use QoS profiles 116A and 116B (collectively "QoS information 116") to provide subscribers using subscriber devices 118A and 118B (collectively "subscriber devices 118") a requested QoS class for unicast packet flows. Further, SE routers 112 provide QoS information to CPE devices 114 to dynamically configure QoS profiles 120A and 120B (collectively "QoS profiles 120") maintained by CPE devices 114 for layer-2 links, e.g., VCs or VLANs, between CPE devices 114 and subscriber devices 118. QoS profiles 120 control CPE devices 114 to forward packets on the layer-2 links facilitate packet transmission according to the requested QoS class. By dynamically configuring QoS profiles 120 maintained by CPE device 114, SE routers 112 may provide improved QoS for subscriber devices 118 than conventional SE routers 112 that do not provide QoS information to CPE devices 114.

An exemplary unicast packet flow for which SE routers 112 may provide an enhanced QoS is a unicast Voice over Internet Protocol (VoIP) call between subscriber devices 118 over a network 122. Subscriber devices 118 used for a VoIP call may be, for example, personal computers, laptop computers, or handheld computers that include or are coupled to a speaker and microphone to facilitate voice communication. A subscriber device 118 may also be a telephone coupled to or incorporating a computing device that interfaces with CPE devices 114 and performs upper layer functions necessary to establish a VoIP call.

CPE devices 114 are data link layer customer premises devices that couple subscriber devices 118 to SE routers 112 and network 122. CPE devices 114 may be modems, wireless access points, or switches. CPE devices 114A and 114B are coupled to SE routers 112A and 112B via switches 124A and 124B (collectively "switches 124"), respectively. Switches 124 may be DSLAMS, CMTSs, or Ethernet bridges, as described above.

Network 122 may be a packet-based network, such as the Internet, and may include a number of autonomous systems (not shown), and devices, such as additional routers and switches (not shown), to route packets across network 122. SE routers 112 may be maintained by a single NSP, or different NSPs that provide multimedia services to subscribers associated with subscriber devices 118. SE routers 112 may serve as B-RASs for subscriber devices 118.

Subscriber device 118A places a VoIP call to a subscriber device 118B via network 122 by negotiating a VoIP session with subscriber device 118B. Subscriber devices 118 also send request messages to SE routers 112 requesting an enhanced QoS for the packet flow that will carry the VoIP call. In response to the request messages, SE routers 112 verify authentication and authorization information previously received from respective servers 126A and 126B to authenticate the respective subscribers, and to determine whether the respective subscribers are authorized to receive a requested QoS class for a VoIP call. Servers 126 may be, for example, RADIUS servers. In some embodiments, SE routers 112 are served by a single server 126.

Servers 126A and 126B store QoS profiles 128A and 128B (collectively "QoS profiles 128"), respectively. QoS profiles 128 describe the QoS classes, if any, that subscribers, such as the subscribers associated with subscriber devices 118, are authorized to receive. QoS profiles 116 maintained by SE routers 112 includes QoS information received from servers 126 when subscriber associated with subscriber devices 118 previously logged on or otherwise activated their multimedia service accounts. If SE routers 112 determine that the subscribers associated with subscriber devices 118 are authorized to use the requested QoS class for the VoIP call based on information contained in QoS profiles 116, SE routers 112A and 112B identify information within QoS profiles 116A and 116B, respectively, describing packet transmission according to the QoS class requested by subscriber devices 118A and 118B for the call. QoS profiles 116 may include, for example, information describing a designated route or packet flow that may be used by SE routers 112 to provide an enhanced QoS for the VoIP call. The indicated route or packet flow may provided greater bandwidth, or may be dedicated to or provide priority for VoIP packets.

QoS profiles 116 also includes information for use by CPE devices 114 to provide an enhanced QoS for the VoIP call. SE routers 112 provide such information to CPE devices 114 to cause CPE devices to facilitate the requested QoS class for the VoIP call. CPE devices 114 store the QoS information provided by SE routers 112 as QoS profiles 120 for the layer-2 links between CPE devices 114 and subscriber devices 118. QoS profiles 120 may include, for example, information directing CPE devices 114 to provide preferential queuing for VoIP packets.

Figure 8:
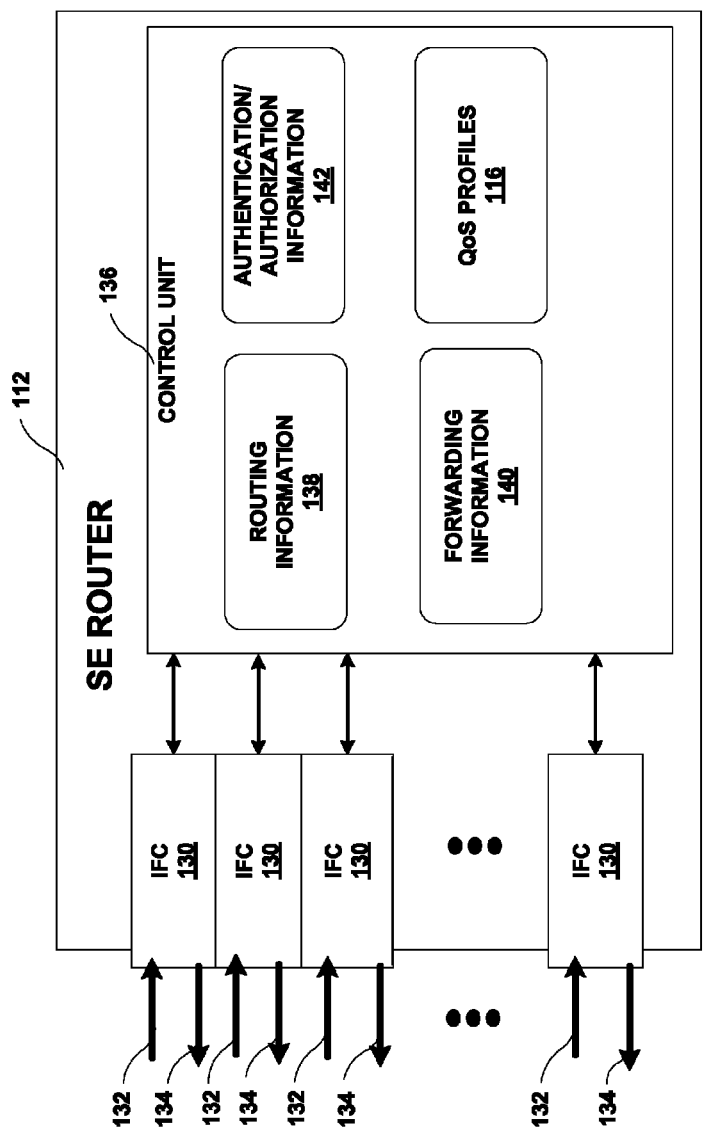
FIG. 8 is a block diagram illustrating an example service edge router that controls packet forwarding by a customer premises equipment device to facilitate a requested Quality of Service class for a unicast packet flow.

FIG. 8 is a block diagram illustrating an example SE router 112. SE router 112 can provide a requested QoS class for a packet flow, such as a VoIP call, and can also control a CPE device 114 to facilitate the requested QoS class for the packet flow, as described above. SE router 112 includes IFCs 130, inbound and outbound links 132 and 134, and a control unit 136 that maintains routing information 138 and forwarding information 140 to forward packets received on inbound links 134 as described above with reference to SE router 22, which included IFCs 50, inbound and outbound links 52 and 54, and control unit 56 that maintains routing information 58 and forwarding information 60, and FIG. 4.

Control unit 136 maintains QoS profiles 116 that are used by control unit 136 to provide a requested QoS class to one or more subscribers for one or more packet flows. Control unit 136, for example, may receive a message requesting authentication and authorization for a VoIP call with a particular QoS class from a subscriber device 118 via one of inbound links 132 and IFCs 130. Control unit 136 checks authentication/authorization information 142 to authenticate and authorize the subscriber associated with the requesting subscriber device 118, and to accesses QoS information for the VoIP call stored within QoS profiles 116. As described above, the QoS profiles may include information describing a route packet flow that may be used by control unit 136 to provide packet transmission according to the requested QoS class for the VoIP call.

QoS profiles 116 may also include information indicating a queuing preference for VoIP packets to be used by a CPE device 114 to facilitate packet transmission according to the requested QoS class for the VoIP call. Control unit 136 sends a control message to the CPE device 114 via one of IFCs 130 and a respective one of outbound links 134 to direct the CPE device 114 to implement the indicated preferential queuing for the VoIP call. Control unit 136 may send control messages to the CPE device 114 on a dedicated control ATM VC, as described above with reference communication between SE routers 22 and switches 24 of FIG. 2.

Control unit 136 may include one or more microprocessors, DSPs, ASICs, FPGAs, or other logic circuitry. Control unit 136 may include memory (not shown) that stores computer-readable program instructions that cause control unit 136 to perform the functions ascribed to it herein. The memory may include any magnetic, optical, or electrical media, such as a RAM, ROM, hard disk, CD-ROM, or EEPROM. Control unit 136 may maintain routing information 138, forwarding information 140, and QoS information 116 in memory in the form of one or more tables, databases, link lists, radix trees, databases, flat files, or any other data structures.

Figure 9:
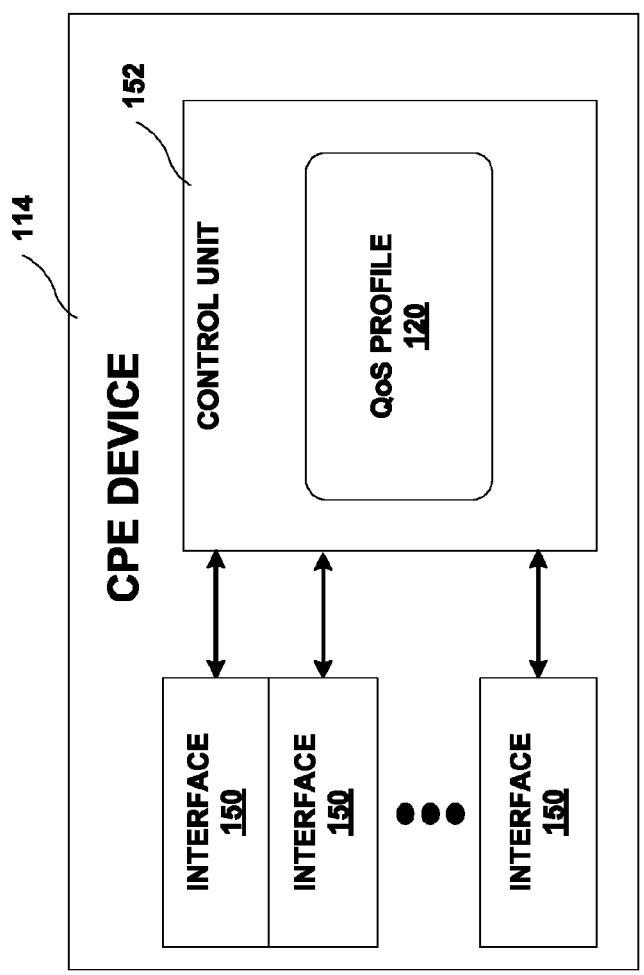
FIG. 9 is a block diagram illustrating an example customer premises equipment device that receives Quality of Service information from a service edge router to facilitate a requested Quality of Service for a unicast packet flow based on the information.

FIG. 9 is a block diagram illustrating an example CPE device 114 that receives QoS information from a SE router 112, and dynamically configures a QoS profile 120 for a layer-2 link between CPE device 114 and a subscriber device 118 based on the QoS information. As described above, CPE device 114 may be, for example, a modem, wireless access point, or switch. CPE device 114 includes interfaces 150 for coupling CPE device 114 to one or more subscriber devices or one or more other CPE devices, and for coupling CPE device 114 to network 122, e.g., to a SE router 112 via a switch 124. Interfaces 150 may include, for example, IFCs, such as IFCs 50, 70 and 130 described above, or transceivers for communication via a wireless medium, such as communication according to one of the IEEE 802.11 family of standards. Where CPE device 114 is a modem, interfaces 150 may include or be coupled to a control unit 152 via circuitry (not shown) for modulating and demodulating signals sent or received by CPE device 114 via interfaces 150.

Control unit 152 receives cells, frames, or otherwise encapsulated packets from a switch 124, and forwards the packets therein to a connected subscriber device 118 within Ethernet frames according to either of the IEEE 802.3 or 802.11 families of standards. Control unit 152 also receives Ethernet frames from the connected subscriber device 118, and encapsulates the packets therein for transmission to the switch 124. Control unit 152 receives a control message from SE router 112, as described above, and dynamically configures a QoS profile 120 based on the control message. Based on QoS profile 120, control unit 152 provides packet transmission on the layer-2 link according to a requested QoS class for a packet flow for the connected subscriber device 118. For example, as described above, control unit may preferentially queue packets for the packet flow based on QoS profile 120.

Control unit 152 may include one or more microprocessors, DSPs, ASICs, FPGAs, or other logic circuitry. Control unit 152 may include memory (not shown) that stores computer-readable program instructions that cause control unit 152 to perform the functions ascribed to it herein. The memory may include any magnetic, optical, or electrical media, such as a RAM, ROM, hard disk, CD-ROM, or EEPROM. Control unit 152 may maintain QoS information 120 in the memory.

Figure 10:
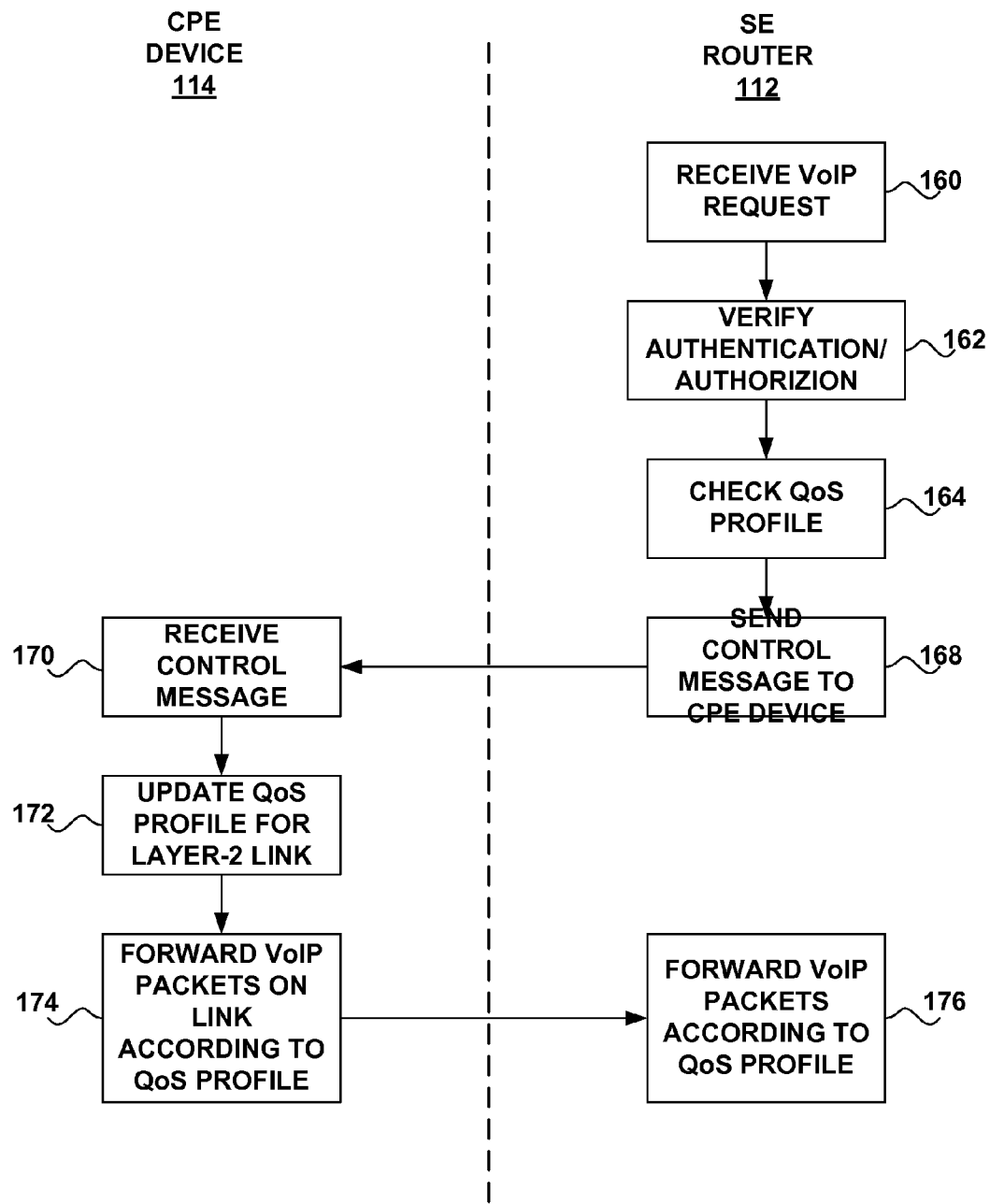
FIG. 10 is a flowchart illustrating an example method in which a service edge router controls packet forwarding by a customer premises equipment device to facilitate a requested Quality of Service class for a unicast packet flow consistent with the principles of the invention.

FIG. 10 is a flowchart illustrating an example method in which a SE router 112 provides QoS information to a CPE device 114 consistent with the principles of the invention. In particular FIG. 10 illustrates an example method in which the SE router 112 and the CPE device use QoS information to provide packet transmission according to a requested QoS class for a unicast packet flow, which, in the illustrated example, is a VoIP call. When a subscriber using a subscriber device 118 initiates a VoIP call, SE router 112 receives a VoIP request message from the subscriber device 118 (160). The request message may request authentication and authorization for a VoIP call with packet transmission according to a particular QoS class.

SE router 112 checks authentication/authorization information 142 to authenticate and authorize the subscriber (162), and to retrieves QoS information for the VoIP call from QoS profiles 116 (164). As described above, the QoS profiles 116 may include information describing a route or packet flow that may be used by SE router 112 to provide packet transmission according to the requested QoS class for the VoIP call, and information describing preferential queuing that may be used by CPE device 114 to provide packet transmission according to the requested QoS class for the VoIP call.

SE router 112 sends a control message to CPE device 114 that includes the QoS information used by CPE device 114 to provide packet transmission according to the requested QoS class for the VoIP call (168). As described above, the control message may be an in-band message, and may be sent to CPE via a dedicated control VC or VLAN. Based on the information contained in the control message, CPE device 114 dynamically configures a QoS profile 120 for a layer-2 link between CPE device 114 and the subscriber device 118 (172). CPE device 114 forwards VoIP packets to the attached subscriber device and to switch via the layer-2 link to provide packet transmission according to the requested QoS class by, for example, preferentially queuing the VoIP packets (174). SE router 112 forwards VoIP packets to provide packet transmission according to the QoS class indicated by QoS information 116 by, for example, forwarding the VoIP packets on a route or packet flow across network 122 that is designated for VoIP packet traffic (176).

Figure 11:
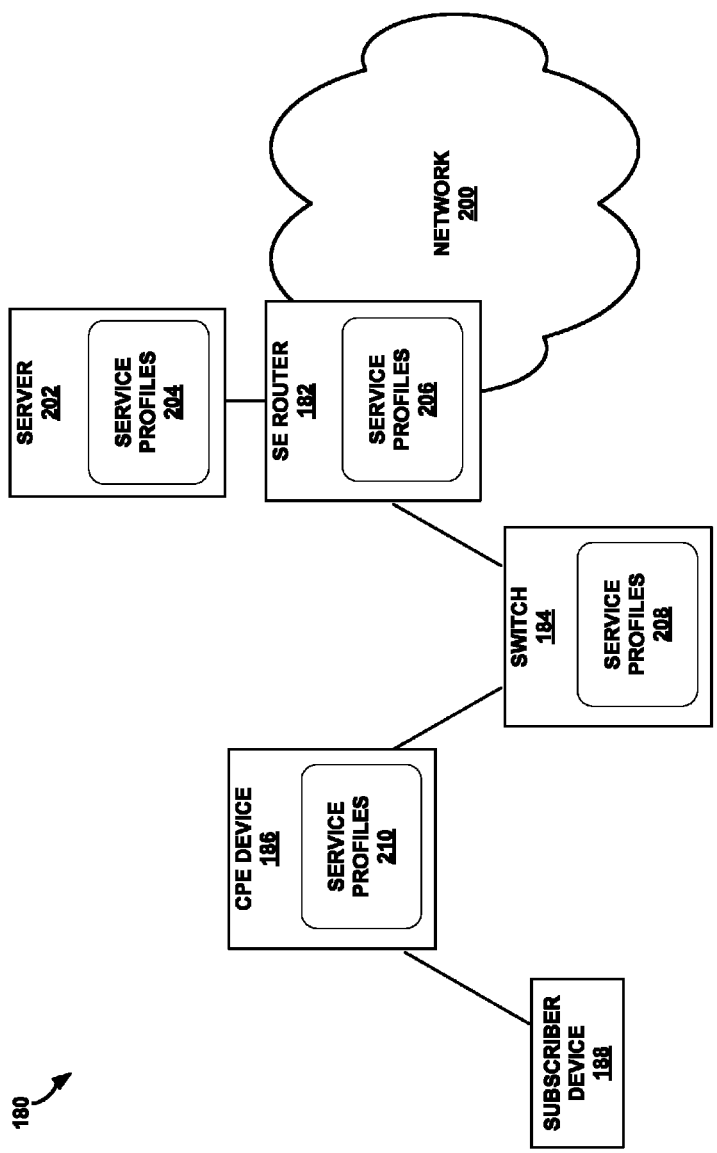
FIG. 11 is a block diagram illustrating an example multimedia networking environment in which a service edge router controls packet forwarding by a switch and a customer premises equipment device to provide multimedia services to a subscriber according to an associated service profile consistent with the principles of the invention.

FIG. 11 is a block diagram illustrating an example multimedia networking environment 180 in which a SE router 182 controls packet forwarding by a switch 184 and a CPE device 186 to provide multimedia service to a subscriber according to an associated service profile consistent with the principles of the invention. A service profile for a subscriber may include, for example, a one or more general QoS classes for packet flows originating from or destined for a subscriber device 188 associated with the subscriber. The service profile may identify, for example, routes or packet flows through a network 190 that SE router 182 may forward packets originating from subscriber device 188 on. The service profile may also identify layer-2 links, e.g., VCs, VLANs, or the like, configured between SE router 182, switch 184 and CPE device 186, that packet flows originating from or destined for subscriber device 188 may be forwarded on. The service profile may identify classes of packets that may be forwarded on preferential packet flows, VCs, VLANs, or the like. Further, the service profile may identify a preference level for queuing of packets originating from or destined for subscriber device 188.

Network 200 may be a packet-based network, such as the Internet, as described above. Switch 184 may be, for example, a DSLAM, CMTS, or Ethernet bridge, as described above. CPE device 186 may be, for example, a modem, wireless access point, or switch, as described above. Subscriber device 188 may be, for example, a personal computer, laptop computer, handheld computer, television set-top box, or Internet phone, as described above. Although not shown in FIG. 11 for ease of description, it is understood that SE router 182 may be coupled to a plurality of switches, that each of the switches may be coupled to a plurality of CPE devices, and that each of the devices 182-186 may provide service according to a respective service profile for each of multiple subscribers served by that device.

By controlling packet forwarding by switch 184 and CPE device 186 in order to provide multimedia service for a subscriber according to a service profile, PE router 182 may improve the service from the perspective of the subscriber, e.g., improve the overall QoS provided to the subscriber. Further, to the extent that conventional data link layer devices have received some service profile information, PE router 182 provides more streamlined distribution of the service profile information to switch 184 and CPE device 186.

A service profile for the subscriber may be created upon initiation of the multimedia service account for the subscriber, and may be updated as services or the subscription of the subscriber to those services changes. Consequently, it is desirable that devices 182-186 receive service profile information when such events occur.

For example, from the perspective of devices 182-186, an event indicating initiation of a new subscriber service account is the physical coupling of CPE device 186 to switch 184. When CPE device 186 is physically coupled to switch 184, CPE device 186 and switch 184 perform a synchronization protocol, and switch 184 reports the synchronization rate to SE router 182. In DSL embodiments where switch 184 is a DSLAM, the synchronization may be performed by switch 184 and CPE device 186 in accordance with the ATM Integrated Local Management Interface (ILMI) protocol. Switch 184 may also exchange queuing profile information between CPE device 186 and SE router 182, and provide a MAC address for CPE device 186 to SE router 182. Switch 184 may exchange information with SE router 182 using the same messaging protocol described herein as being used by routers to provide control messages to data link layer devices, e.g., may send in-band IP packets containing the messages.

In response to receiving the MAC address for CPE device 186 from switch 184, SE router 182 queries a server 202 for a service profile 204 stored therein for a subscriber associated with CPE device 186. SE router 182 retrieves the portion of service profile 204 used by devices 182-186, and stores the information as service profile 206. Server 202 may be a RADIUS server. Further, as described above, SE router 182 may act as a B-RAS for subscriber device 188.

SE router sends control messages to dynamically configure services profiles 208 and 210, maintained by switch 184 and CPE device 186, respectively. The control messages provide appropriate portions of service profiles 206 to the devices. Service profiles 208 and 210 may include QoS profiles for layer-2 links between devices 182-188.

Figure 12:
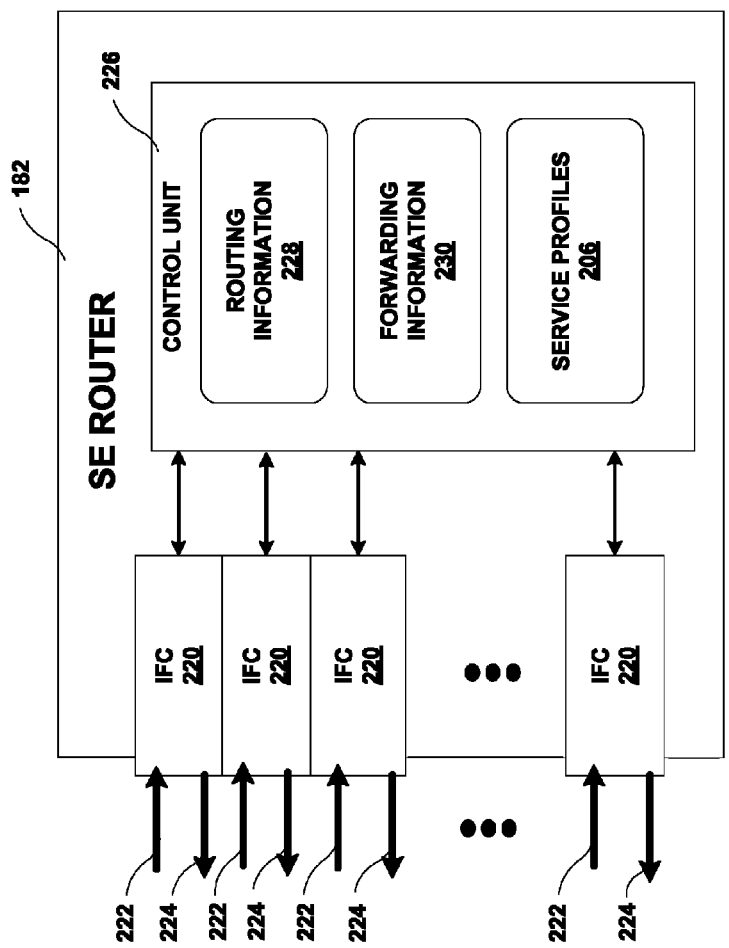
FIG. 12 is a block diagram illustrating an example service edge router that controls packet forwarding by a switch and a customer premises equipment device to provide multimedia services to a subscriber according to a service profile.

FIG. 12 is a block diagram illustrating an example SE router 182. SE router 182 includes IFCs 220, inbound and outbound links 222 and 224, and a control unit 226 that maintains routing information 228 and forwarding information 230 to forward packets received on inbound links 222 as described above with reference to SE router 22, which included IFCs 50, inbound and outbound links 52 and 54, and control unit 56 that maintains routing information 58 and forwarding information 60, and FIG. 4.

Control unit 226 maintains service profiles 206 that are used by control unit 226 to provide multimedia services to one or more subscribers according to respective service profiles. Control unit 226, for example, may receive a message indicating a synchronization rate, queuing profile, and MAC address for a new CPE device 186 from a switch 184 via one of inbound links 22 and IFCs 220. Control unit 226 queries a server 202 retrieve a service profile 206 for a subscriber associated with the MAC address. As described above, a service profile 206 for a subscriber may include information describing a general QoS level for packet flows originating from or destined for a subscriber device 188 associated with the subscriber.

Further, as described above, service profiles 206 may include information used by SE router 182 to control packet forwarding by switch 184 and CPE device 186 to provide multimedia services according to the service profile. Control unit 226 sends control messages to the switch 184 and CPE device 186 via one of IFCs 130 and a respective one of outbound links 134 to control the data link layer devices to provide Internet service according to the service profile information. Control unit 226 may send control messages to switch 184 and CPE device 186 on a dedicated control ATM VC, as described above with reference communication between SE routers 22 and switches 24 of FIG. 2.

Control unit 136 may include one or more microprocessors, DSPs, ASICs, FPGAs, or other logic circuitry. Control unit 136 may include memory (not shown) that stores computer-readable program instructions that cause control unit 136 to perform the functions ascribed to it herein. The memory may include any magnetic, optical, or electrical media, such as a RAM, ROM, hard disk, CD-ROM, or EEPROM. Control unit 136 may maintain routing information 138, forwarding information 140, and QoS information 116 in memory in the form of one or more tables, databases, link lists, radix trees, databases, flat files, or any other data structures.

Figure 13:
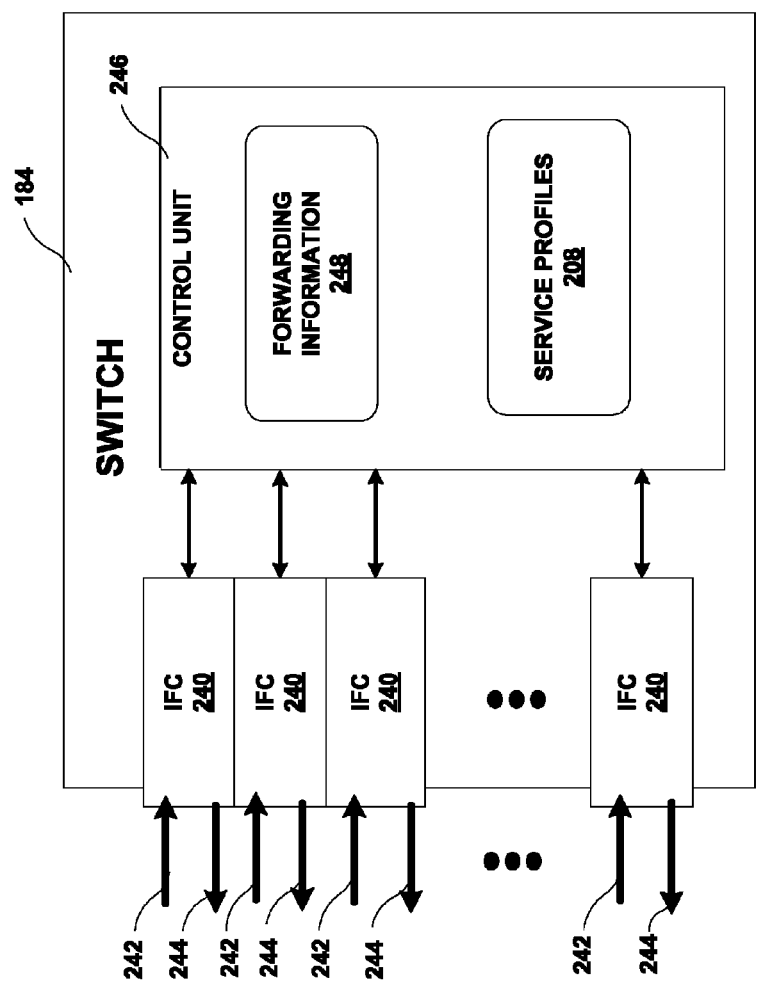
FIG. 13 is a block diagram illustrating an example switch that receives subscriber service profile information from a service edge router and forwards packets for a subscriber according to the service profile information.

FIG. 13 is a block diagram illustrating an example switch 184. Switch 184 may be, for example, a DSLAM, CMTS, or Ethernet bridge, as described above. Switch 184 includes IFCs 240 that receive and send flows of ATM cells or Ethernet frames via links 242 and 244, respectively, and a control unit 246 to control forwarding of the cell, frames or other encapsulated packets based on forwarding information 248. Switch 184 may be configured and function as described above with reference to switch 24 of FIG. 4, which included IFCs 70, inbound and outbound links 72 and 74, and control unit 76 that maintain forwarding information 78.

Control unit 246 performs a synchronization protocol with newly connected CPE device 186, and receives synchronization rate information and a MAC address for CPE device 186. Control unit 246 sends one or more control messages, which may be in-band IP messages, to SE router 182. The control messages include the synchronization rate information and the MAC address for CPE device 186. Control unit 246 may also exchange queuing profile information with CPE device 186 and SE router 182.

Control unit 246 receives a control message including service profile information from SE router 182, as described above, and stores service profile information as a service profile 208. Control unit 246 forwards packets for subscriber device 188 based on the associated service profile 208. For example, control unit 246 may place outbound packets on particular VCs, or queue inbound and outbound packets as indicated by the associated service profile 208. Service profile 208 may include QoS profiles for layer-2 links, such as VCs Control unit 246 may include one or more microprocessors, DSPs, ASICs, FPGAs, or other logic circuitry. Control unit 246 may include memory (not shown) that stores computer-readable program instructions that cause control unit 246 to perform the functions ascribed to it herein. The memory may include any magnetic, optical, or electrical media, such as a RAM, ROM, hard disk, CD-ROM, or EEPROM. Control unit 246 may maintain service profile information 210 in the memory.

Figure 14:
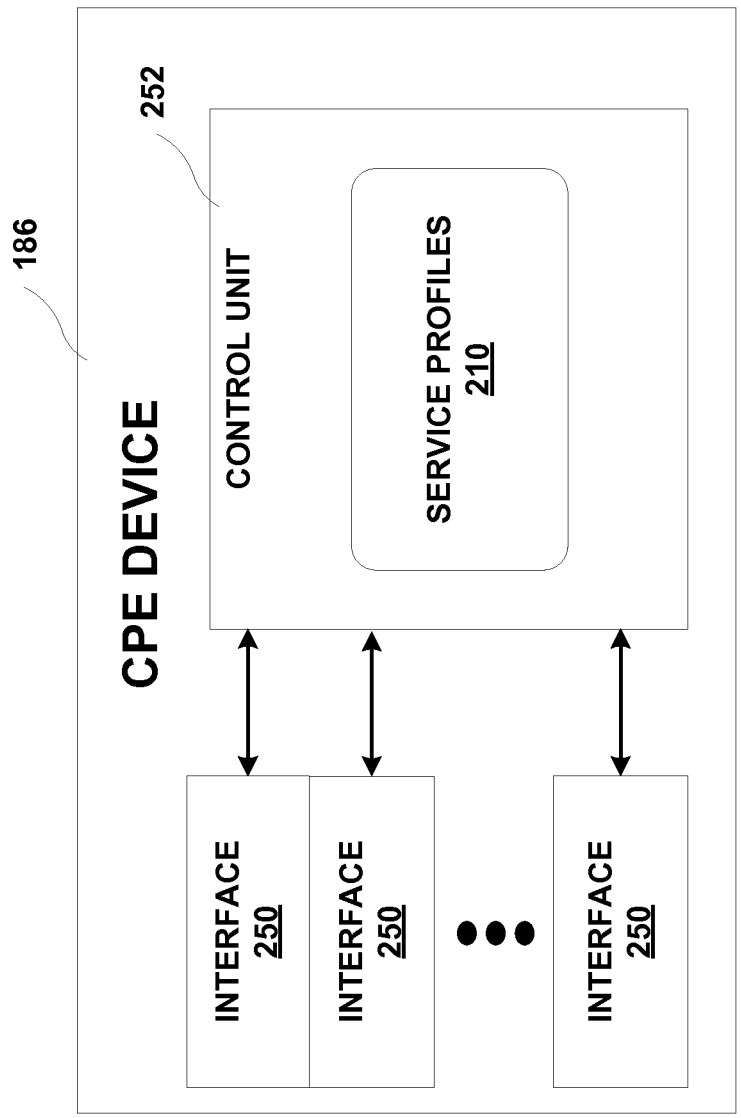
FIG. 14 is a block diagram illustrating an example customer premises equipment device that receives subscriber service profile information from a service edge router and forwards packets for a subscriber according to the service profile information.

FIG. 14 is a block diagram illustrating an example CPE device 186. As described above, CPE device 186 may be, for example, a modem, wireless access point, or switch. CPE device 186 includes interfaces 250, which may be configured as described above with reference to interface 150, CPE device 114, and FIG. 9, and a control unit 252, which forwards packets to and from subscriber device 188, as described above with reference to CPE device 114 and FIG. 9.

Control unit 252 detects physical connection of one or more of interfaces 250 to switch 184, and performs a synchronization protocol with switch 184 as described above. Control unit 252 receives a control message including service profile information from SE router 182, as described above, and stores the service profile information as a service profile 210. Control unit 252 forwards packets for the subscriber associated with subscriber device 188 based on service profile 210. For example, control unit 252 may place outbound packets on particular VCs, or queue inbound and outbound packets as indicated by service profile 210. Service profile 210 may include quality of service profiles for layer-2 links, such as VCs.

Control unit 252 may include one or more microprocessors, DSPs, ASICs, FPGAs, or other logic circuitry. Control unit 252 may include memory (not shown) that stores computer-readable program instructions that cause control unit 252 to perform the functions ascribed to it herein. The memory may include any magnetic, optical, or electrical media, such as a RAM, ROM, hard disk, CD-ROM, or EEPROM. Control unit 252 may maintain service profile information 210 in the memory.

Figure 15:
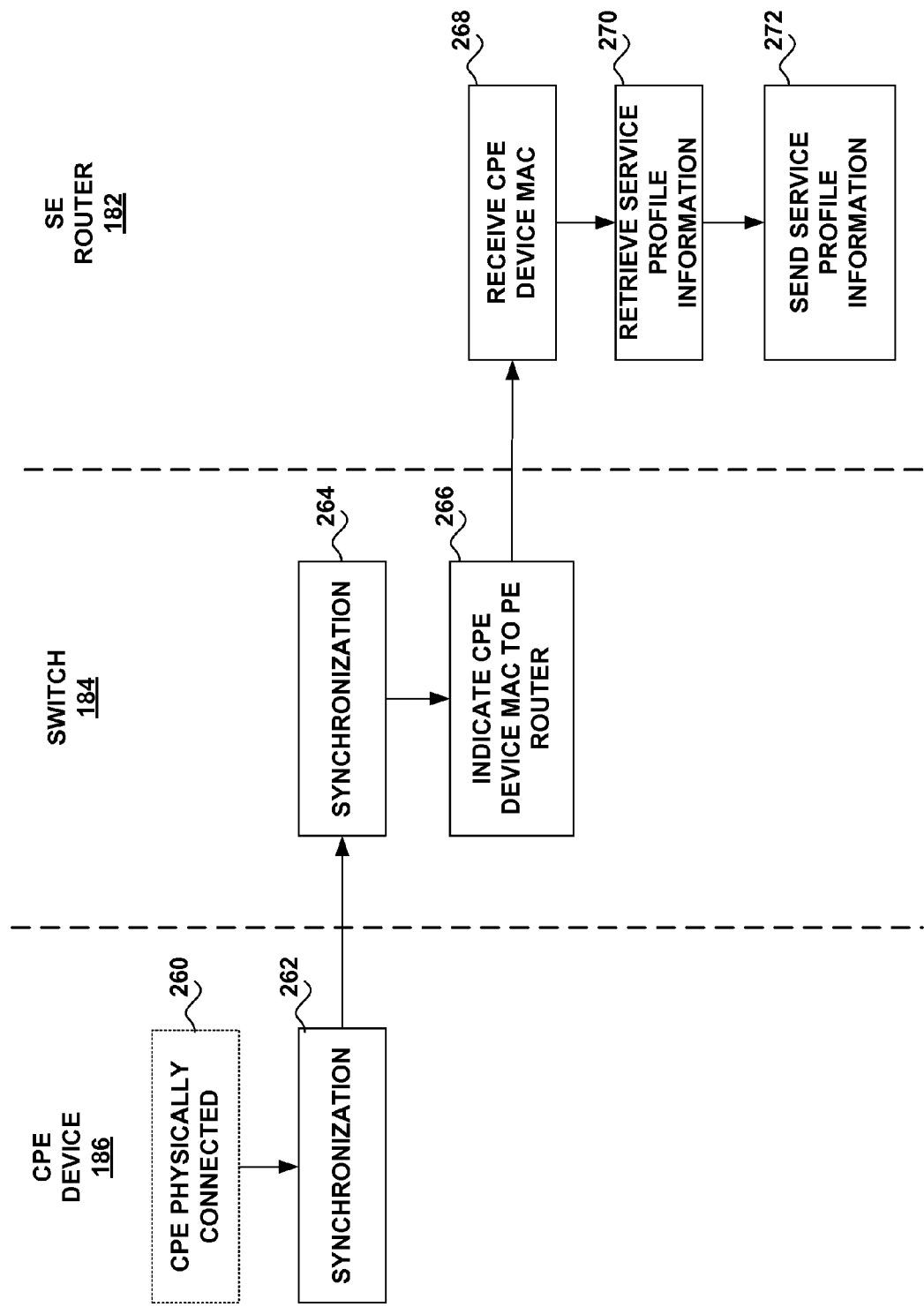
FIG. 15 is a flowchart illustrating an example method in which a service edge router controls packet forwarding by a switch and a customer premises equipment device to provide multimedia services to a subscriber according to a service profile.

FIG. 15 is a flowchart illustrating an example method in which a SE router 182 controls packet forwarding by a switch 184 and a CPE device 186 to provide multimedia service to a subscriber according to a respective service profile. CPE device 186 detects a physical connection to switch 184 (260), and initiates a synchronization protocol between CPE device 186 and switch 184 in response to the detection (262, 264). After the synchronization routine is completed, switch 184 reports the synchronization rate, and the MAC address of CPE device 186 to SE router 182 (266). Switch 184 may also exchange queuing profile information between CPE device 186 and SE router 182. As mentioned above, switch 184 may exchange information with SE router 182 using the same messaging protocol described herein as being used by routers to provide control messages to data link layer devices, e.g., may send in-band IP packets containing the messages.

In response to receiving the MAC address from switch 184 (268), SE router 182 queries a server 202 for service profile information from a service profile 204 associated with the MAC address stored therein. SE router 182 retrieves the portion of the service profile information used by devices 182-186 (270), and stores the information as service profile 206. SE router 182 sends control messages to switch 184 and CPE device 186 to provide appropriate portions of service profile 206 to the devices to control packet forwarding by switch 184 and CPE device 186 to provide multimedia service according to a service profile for the subscriber associated with the MAC address (272). Providing multimedia service according to the service profile may include providing data transmission according to a QoS class indicated by the profile, as discussed above.

Various embodiments of the invention have been described. However, one skilled in the art will appreciate that additions or modifications may be made to the described embodiments without departing from the scope of the invention. For example, although routers described herein as controlling data link layer devices have been primarily described as provider edge (SE) routers, the invention is not so limited. Other routers, such as routers within the core of a network, may perform the functions ascribed to SE routers herein. These and other embodiments are within the scope of the following claims.

The invention claimed is:

1. A system comprising:
a network layer device that receives a plurality of multicasting protocol messages identifying a multicast stream from a respective plurality of subscriber devices; and
a data link layer device comprising an Ethernet switch that stores a control object,
wherein the network layer device and the data link layer device communicate with each other via an Ethernet network, and the multicast stream comprises a plurality of Internet Protocol (IP) packets,
wherein the network layer device sends one or more control messages to the data link layer device via an Ethernet control channel in response to the multicasting protocol messages, the control messages of the Ethernet control channel comprising dedicated IP packets encapsulated in Ethernet frames to configure the control object stored by the data link layer device,
wherein, separate from the control messages, the network layer device sends the IP packets of the multicast stream encapsulated within Ethernet frames to the data link layer device, and
wherein the data link layer device receives the multicast stream from the network layer device, and replicates and forwards the multicast stream to the subscriber devices in accordance with the configuration of the control object.

2. The system of claim 1, wherein the data link layer device stores multicast filter information, the network layer device sends the one or more control messages to the data link layer device to cause the data link layer device to dynamically configure the multicast filter information in accordance with the multicasting protocol message, and the data link layer device replicates and forwards the multicast stream based on the configuration of the multicast filter information.

3. The system of claim 2,
wherein the network layer device associates the multicast stream with one of a virtual local area network or an address, and encapsulates and forwards packets for the multicast stream to the data link layer device in accordance with the association,
wherein the data link layer device dynamically configures the multicast filter information to associate the one of the virtual local area network or the address that is associated with the multicast stream with one or more addresses that are associated with the subscriber devices.

4. The system of claim 1, wherein the network layer device maintains information that classifies multicast streams as one of premium and non-premium, determines whether the multicast stream identified by the multicast protocol message is a premium multicast stream, and controls the data link layer device to replicate and forward the multicast stream based on the determination.

5. The system of claim 4, wherein the network layer device replicates and forwards the multicast stream on a per switch basis when the requested multicast stream is a premium multicast stream, and the network layer device replicates the multicast stream on a per subscriber basis when the requested multicast stream is a non-premium multicast stream.

6. The system of claim 1, wherein the network layer device comprises a service edge router.

7. The system of claim 6, wherein the service edge router comprises a broadband remote access server.

8. The system of claim 1, wherein the network layer device sends the one or more control messages to the data link layer device via a virtual local area network that is reserved for transmission of the control messages.

9. The system of claim 1, further comprising a plurality of customer premises equipment (CPE) devices, wherein the data link layer device is coupled to the plurality of subscriber devices by the plurality of CPE devices.

10. A method comprising:
receiving a plurality of multicasting protocol messages identifying a multicast stream from a respective plurality of subscriber devices by a network layer device;
sending the multicast stream from the network layer device to a data link layer device via an Ethernet network, wherein the multicast stream comprises a plurality of Internet Protocol (IP) packets, wherein the data link layer device comprises an Ethernet switch, and wherein sending the multicast stream via the Ethernet network comprises encapsulating the IP packets of the multicast stream within Ethernet frames; and
sending one or more control messages, the control messages comprising IP packets encapsulated in Ethernet frames separate from the multicast stream, from the network layer device to the data link layer device via an Ethernet control channel in response to the multicasting protocol messages to configure a control object stored by the data link layer device to control the data link layer device to replicate and forward the multicast stream to the subscriber devices in accordance with the multicasting protocol messages.

11. The method of claim 10, wherein sending one or more control messages comprises dynamically configuring multicast filter information of the control object stored by the data link layer device to control the data link layer device to perform multicast elaboration in accordance with the multicasting protocol messages.

12. The method of claim 11, further comprising:
associating the multicast stream with one of a virtual local area network or an address,
wherein the sending the multicast stream and encapsulating the IP packets of the multicast stream comprises encapsulating and forwarding packets for the multicast stream to the data link layer device in accordance with the association,
wherein dynamically configuring multicast filter information comprises dynamically configuring the multicast filter information to associate the one of the virtual local area network or the address that is associated with the multicast stream with an address that is associated with the subscriber device.

13. The method of claim 11, further comprising:
maintaining classification information for multicast streams within the network layer device; and
dynamically configuring the multicast filter information stored by the data link layer device based on the classification information.

14. The method of claim 13,
wherein maintaining classification information comprises maintaining information classifying multicast streams as one of premium and non-premium,
the method further comprising determining whether the multicast stream is a premium multicast stream, and wherein dynamically configuring the multicast filter information comprises dynamically configuring the multicast filter information based on the determination.

15. The method of claim 14, further comprising:
replicating the requested multicast stream at the network layer device on a per data link layer device basis when the requested multicast stream is a premium multicast stream; and
replicating the requested multicast stream at the network layer device on a per subscriber basis when the requested multicast stream is a non-premium multicast stream.

16. The method of claim 10, wherein sending one or more control messages via an Ethernet control channel comprises sending the control messages via a virtual local area network that is reserved for transmission of the control messages.

17. The method of claim 10, wherein the data link layer device is coupled to the plurality of subscriber devices by a plurality of customer premises equipment (CPE) devices.

18. A network layer device comprising:
an interface that receives a plurality of multicasting protocol messages identifying a multicast stream from a respective plurality of subscriber devices; and
a control unit that sends, via the interface, the multicast stream to a data link layer device operable as an Ethernet switch, and sends one or more control messages to the data link layer device via a dedicated Ethernet control channel separate from the multicast stream in response to the multicasting protocol messages to configure a control object stored by the data link layer device to control the data link layer device to replicate and forward the multicast stream to the subscriber devices in accordance with the multicasting protocol messages,
wherein the multicast stream comprises a plurality of Internet Protocol (IP) packets and the control unit sends the IP packets of multicast stream encapsulated within Ethernet frames to the data link layer device via an Ethernet network, and the control messages of the dedicated Ethernet control channel comprise IP packets encapsulated in Ethernet frames.

19. The network layer device of claim 18, wherein the one or more control messages dynamically configure multicast filter information stored by the data link layer device to control the data link layer device to perform multicast elaboration in accordance with the multicasting protocol messages.

20. The network layer device of claim 19, wherein the control unit maintains classification information for multicast streams and dynamically configures the multicast filter information stored by the data link layer device based on the classification information.

21. The network layer device of claim 20,
wherein the classification information classifies multicast streams as one of premium and non-premium, and
wherein the control unit determines whether the multicast stream is a premium multicast stream, and dynamically configures the multicast filter information stored by the data link layer device based on the determination.

22. The network layer device of claim 21, wherein the control unit replicates the requested multicast stream on a per data link layer device basis when the requested multicast stream is a premium multicast stream, and replicates the requested multicast stream at the network layer device on a per subscriber basis when the requested multicast stream is a non-premium multicast stream.

23. The network layer device of claim 18, wherein the control unit sends the control messages via a virtual local area network that is reserved for transmission of the control messages.

* * * * *